US012677720B2

(12) United States Patent (10) Patent No.: US 12,677,720 B2
Friedrick et al. (45) Date of Patent: Jul. 14, 2026

(54) REMOTE AGRICULTURAL VEHICLE INTERFACE SYSTEM AND METHODS FOR SAME

(71) Applicant: Raven Industries, Inc., Sioux Falls, SD (US)

(72) Inventors: Caleb Vaughn Friedrick, Regina (CA); Jesse Lee Wagers, Harrisburg, SD (US); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 109 days.

(21) Appl. No.: 18/634,668

(22) Filed: Apr. 12, 2024

(65) Prior Publication Data

US 2024/0341214 A1 Oct. 17, 2024

Related U.S. Application Data

(60) Provisional application No. 63/496,345, filed on Apr. 14, 2023.

(51) Int. Cl.
*A01B 69/04* (2006.01)
*G05D 1/224* (2024.01)
(Continued)

(52) U.S. Cl.
CPC ......... *A01B 69/008* (2013.01); *G05D 1/2249* (2024.01); *G05D 2105/15* (2024.01); *G05D 2107/21* (2024.01)

(58) Field of Classification Search
None
See application file for complete search history.

(56) References Cited

U.S. PATENT DOCUMENTS

2017/0090740 A1    3/2017    Tentinger et al.
2019/0114847 A1    4/2019    Wagner et al.
(Continued)

FOREIGN PATENT DOCUMENTS

EP        3427143        8/2021
EP        3944745        2/2022
WO      2024216222      10/2024

OTHER PUBLICATIONS

Tumenjargal et al., "Development of ISO 11783 Compliant Agricultural Systems: Experience Report", Automotive Systems and Software Engineering, 2019, pp. 197-223 (Year: 2019).*
(Continued)

*Primary Examiner* — Tamara L Weber
(74) *Attorney, Agent, or Firm* — Schwegman Lundberg & Woessner, P.A.

(57) ABSTRACT

A remote agricultural vehicle interface system includes an agricultural vehicle capability input configured to receive one or more vehicle characteristics of an agricultural vehicle and a remote vehicle interface generator that generates a remote vehicle interface for the agricultural vehicle based on the vehicle characteristics. The remote vehicle interface includes one or more remote outputs and one or more remote inputs for the agricultural vehicle. A remote access evaluator includes one or more of an electronic device input, a vehicle to device connection input, or a vehicle to device range input configured to receive one or more range characteristics. An interface refinement tool is configured to refine the remote vehicle interface based on one or more of electronic device characteristics, connection characteristics, or range characteristics. A remote vehicle interface output is configured to communicate the remote vehicle interface refined with the interface refinement tool to a candidate electronic device.

43 Claims, 10 Drawing Sheets

(51) Int. Cl.
    *G05D 105/15*     (2024.01)
    *G05D 107/20*     (2024.01)

(56)                References Cited

U.S. PATENT DOCUMENTS

| | | |
|---|---|---|
| 2020/0159220 A1 | 5/2020 | Hurd et al. |
| 2020/0409353 A1 | 12/2020 | Hanrieder |
| 2021/0011471 A1 | 1/2021 | Hurd |
| 2022/0304231 A1 | 9/2022 | Faust et al. |

OTHER PUBLICATIONS

"International Application Serial No. PCT US2024 024510, International Search Report mailed Aug. 22, 2024", 5 pgs.
"International Application Serial No. PCT US2024 024510, Written Opinion mailed Aug. 22, 2024", 7 pgs.
"Australian Application Serial No. 2024255523, First Examination Report mailed Nov. 4, 2025", 3 pgs.

\* cited by examiner

406

606

600

108

604

602

602

604

406

706

700

704

106

MACHINES
COMBINE 1
COMBINE 2
TRACTOR 1
TRUCK 1
TRUCK 2

COMBINE 1
SPEED
ENGINE RPM
OIL PRESSURE

702

704

702

REMOTE AGRICULTURAL VEHICLE INTERFACE SYSTEM AND METHODS FOR SAME

COPYRIGHT NOTICE

TECHNICAL FIELD

This document pertains generally, but not by way of limitation, to remote operation and communication with agricultural vehicles, including vehicles or implements.

BACKGROUND

Agricultural vehicles and implements in various examples include a variety of capabilities specific to each of the vehicles or implements. For instance, a tractor includes steering, throttle, transmission, and brake controls. In other examples, the tractor includes other capabilities, including a power take-off (PTO) interface, hydraulic control (and associated hydraulic motors, accumulators, valves, or the like), electrical interfaces, communication devices, sensors, or the like. Similarly agricultural implements include capabilities specific to the implements themselves including spray boom height, agricultural product flow rate or pressure, spray pattern (e.g., for a sprayer), planting depth, row section spacing, coulter force or depth (e.g., for a planter); harvester head height, harvester head speed (e.g., for a combine); cultivation depth; cultivator angle or position (e.g., for a cultivator) or the like. These capabilities further include associated capabilities such as hydraulic controls, pneumatic controls, motor controls, sensors, communication devices, or the like. In some examples, these capabilities are controlled from an associated vehicle such as a tractor hitched to the implement.

In some examples, agricultural vehicles and implements have additional control capabilities, including autonomous control (e.g., one or both of self-driving or self-operation), semi-autonomous control, or the like. In other examples, an operator present with the vehicle or implement or at a remote location has an electronic device that permits remote control of at least some of these capabilities. The electronic device is, in one example, customized to provide access to the capabilities of the subject vehicle or implement (collectively herein, vehicles). For instance, the cab of a tractor may include a control panel or interface configured to provide some level of access to another vehicle or implement (e.g., controls, sensors, or the like) made by the same manufacturer. In other examples, an application for a tablet provides remote access to one or more capabilities of a vehicle or implement (e.g., controls, sensors, or the like).

OVERVIEW

The present inventors have recognized, among other things, that a problem to be solved can include providing a system that flexibly permits interaction (e.g., control, information conveyance, or the like) by a user with agricultural vehicles and implements using a variety of electronic devices, wherein the electronic devices have varying capabilities; variations in access to the vehicle or implement, such as bandwidth or immediacy of information conveyance; line of sight or lack of line of sight; or the like that may permit or frustrate remote interaction as well as aspects of remote interaction.

As described herein, agricultural vehicles and implements (collectively, agricultural vehicles) have various capabilities to conduct specified agricultural operations and have systems and capabilities that support these operations. For instance, an agricultural sprayer includes sprayer booms, articulating joints for sprayer booms, nozzle assemblies, pumps, valves, or the like that work together with one or more electrical, mechanical, or hydraulic systems to conduct spraying operations. A planter includes planting row sections, disks, coulters, actuators for one or more of the row sections or coulters or the like that work together with one or more electrical, mechanical or hydraulic systems to conduct planting operations. Cultivators, harvester heads, spreaders, and other agricultural implements have respective and varied capabilities and supporting systems that operate those capabilities. Vehicles, such as tractors that are hitched to implements often provide one or more electrical, mechanical, or hydraulic power or control to work with the implements cooperatively. Further, autonomous and semi-autonomous vehicles include actuators that permit one or more autonomous or automated steering, braking, transmission, and throttle control.

Autonomous (including semi-autonomous) agricultural vehicles and implements (collectively vehicles or agricultural vehicles) and even non-autonomous agricultural vehicles include sensors that assist in conducting agricultural operations and driving. These sensors include but are not limited to, cameras, video cameras, stereo cameras, radar, light detection and ranging (Lidar), infrared (IR), ultrasound, normalized difference vegetation index (NDVI), flow meters, pressure transducers, concentration sensors, force sensors or the like. In various examples, the agricultural vehicles incorporate monitoring by these sensors to facilitate the operation of the agricultural vehicles and to conduct autonomous control. Accordingly, agricultural vehicles have various capabilities and supporting systems for those capabilities that permit agricultural operations.

Because agricultural vehicles have a wide variety of capabilities, supporting systems, and sensors associated with those capabilities it is difficult to provide a remote control device able to convey information (e.g., status, sensor observations, control instructions, or the like) and at the same time permit control of the various capabilities of the vehicle or implement. Additionally, because of the specificity and variation of different vehicle capabilities, individual configurations of remote control interfaces and devices it is difficult to provide a remote control interface and device that may toggle (e.g., switch) control between various agricultural vehicles (vehicles, implements or both) while at the same time conveying information and permitting control of each of the agricultural vehicles. The difficulty is further frustrated with potential electronic control devices having their own varied capabilities to convey information and conduct control of a vehicle or implement. For instance, a personal computer has different output and input options (e.g., a display, keyboard, mouse, potential audio capability) from those of a tablet computer (e.g., generally a smaller, lower resolution display that is a touch screen). The personal computer provides flexibility of input and control that a tablet computer, in some examples, does not. Similarly, a smartphone may have access to a more limited touch screen and further limited input ability relative to a tablet computer or personal computer. In other examples, virtual reality systems and augmented reality systems provide different output and input options including the potential for a simulated vehicle cabin experience and simulated controls that provide control options and flexibility approaching those of the agricultural vehicle or implement. Optionally, vehicle cabin interfaces (e.g., of a second vehicle) may provide displays, manual controls or the like that permit control of some or many of the capabilities of another vehicle (e.g., first vehicle) or implement.

Quality and variations in available communication interfaces further vary the ability to convey information and conduct control of vehicles or implements. For instance, a personal computer with access to a relatively high bandwidth connection may receive and transmit information (including control instructions) with a small lag relative to the actual experience of the vehicle or implement in the field. The same personal computer remote from the vehicle and on a WIFI network may have significant lag to receive and transmit information. Conversely, a tablet computer or cellular phone has access to various levels of cellular internet connectivity based on data plans, location, or the like that directly affect reception and transmission of information, including speed (download and upload), quality or depth of information, or both. In still other examples, field communications such as vehicle-to-vehicle or vehicle-to-device communications (e.g., radio, WIFI, or the like) may provide near instantaneous information connectivity between a remote-control device and a vehicle or implement. Conversely, relaying information between multiple vehicles in a field, across fields, or the like (e.g., 0.25, 0.5, 1, 10 miles, without a line of sight or the like) may slow or degrade information connectivity.

Further still, variations in capabilities between one or more of types and models of vehicles or implements, firmware for the same, original equipment manufacturers, or after-market systems installed with vehicles or implements may further frustrate information conveyance and remote control of vehicles or implements.

The present subject matter can help provide a solution to this problem, such as by providing a remote agricultural vehicle interface system that assesses the capabilities of agricultural vehicles (including implements), evaluates the capabilities of one or more of potential (herein, candidate) remote electronic control devices, connections (e.g., wireless) or range. The remote agricultural vehicle interface system includes an interface refinement tool that refines a remote vehicle interface based on the evaluated capabilities of one or more of the electronic control devices, connections, or ranges. The system outputs a refined remote vehicle interface to a candidate remote electronic control device. The refined remote vehicle interface includes one or more of remote outputs (for information or status outputs of the agricultural vehicle) and remote inputs for one or more controllable features of the agricultural vehicle. The refined remote vehicle interface is specifically assembled to maintain (including modify) or suspend various remote capabilities for the agricultural vehicle based on the evaluation of the candidate remote system including one or more of the candidate remote electronic control device, the connection between the vehicle and the device, and the range between the vehicle and the device. For example, the refined remote vehicle interface is specifically formatted based on the circumstances involved in the remote control of the of the agricultural vehicle with the remote electronic control device. The remote agricultural vehicle interface system is optionally provided with an agricultural vehicle (e.g., an onboard field computer), a candidate electronic control device (e.g., as computer-readable media implemented with a device processor), a cloud-based system, or the like.

The remote agricultural vehicle interface system includes a remote interface building processor that refines remote interfaces as discussed herein. In a first example, an initial or base remote vehicle interface is generated from an index, database, catalog, or the like with a remote vehicle interface generator of the processor. For instance, an OEM, technician, or the like provides an initial remote vehicle interface based on the capabilities of the agricultural vehicle (e.g., the sensors, actuators, implement characteristics, control inputs for the vehicle, or implement, or the like). In this example, the initial remote vehicle interface is generated (e.g., implemented, accessed, or the like) based on an input vehicle (vehicle or implement make, model, model year, serial number, or the like) provided to an index, database or source of interfaces for instance stored in a memory, accessible online, or the like. The initial remote vehicle interface includes one or more remote outputs and remote inputs associated with the input agricultural vehicle. The initial remote vehicle interface is provided to the remote interface building processor for refinement as provided herein.

In a second example, the remote interface building processor includes an agricultural vehicle capability input that receives vehicle characteristics of the agricultural vehicle (vehicle, implement, or both), such as one or more of the vehicle or implement sensors, actuators, implement characteristics, control inputs for the vehicle or implement or the like. The remote vehicle interface generator assembles a remote interface based on the input vehicle characteristics. For instance, the generator assembles remote outputs including, but not limited to, representative displays and indicators that provide output for the vehicle sensors (e.g., camera views, oil pressure, speed, gear, location, heading, implement status such as flow rate, pressure, spray pattern, droplet size, agricultural product volume, rotations per minute, yield, grain cart load or the like). In another example, the generator assembles remote inputs including, but not limited to, steering controls, throttle and braking, gear, emergency stop or all stop, implement controls (e.g., harvester head height, boom height, flow rate, pressure, spray pattern, droplet size, coulter depth, seed spacing, cultivator depth, or the like).

In either of the implemented or assembled versions of the initial remote vehicle interface the remote interface processor receives the initial interface and conducts further refinements based on characteristics of a candidate remote control system including, but not limited to, one or more of the candidate electronic remote control device, the vehicle to device connection, or the vehicle to device range. As described herein, the remote interface building processor includes a remote access evaluator that receives characteristics of the candidate remote control system, and further includes an interface refinement tool that maintains (including modifies) or suspends the remote outputs and remote inputs of the initial remote vehicle interface according to analysis of those characteristics.

As a first representative example, a personal computer is located approximately 10 miles from an agricultural vehicle, for instance an agricultural sprayer. The personal computer includes a high-speed connection (e.g., cable, broadband, or the like) that transitions to a wireless connection in a field, for instance with cellular connection or a WIFI modem that provides a reliable connection. The personal computer includes a relatively large display (e.g., in comparison to a tablet or smartphone) and, in various examples, includes extensive input capabilities, including one or more of a mouse, keyboard, or touchscreen.

In this example, an initial remote vehicle interface having remote outputs and remote inputs is generated based on the agricultural sprayer specified for remote control. The remote interface building processor includes a remote vehicle interface generator that generates (e.g., implements, accesses, assembles, creates, or the like) the initial remote vehicle interface. For instance, a stored vehicle remote interface is accessed based on identification for the agricultural vehicle (e.g., unique identification, make, model, model year, serial number, or the like). In another example, generation of the initial remote vehicle interface includes inputting of the agricultural vehicle capabilities (e.g., vehicle characteristics) and assembly of the initial remote vehicle interface having the remote outputs and remote inputs based on the input vehicle characteristics. Example input vehicle characteristics for the agricultural sprayer include, but are not limited to, vision sensors (cameras, video cameras, LiDAR, radar, ultrasound or the like), flow meters, pressure transducers, concentration and constituent sensors (e.g., of the sprayed agricultural fluid, injection products or the like), location sensors, boom height sensors, nozzle characteristic sensors, nozzle sensors, hydraulic sensors, boom actuators, pump controllers, nozzle actuators (e.g., valves), nozzle modulating elements (e.g., for spray profile control, such as droplet size, pattern or the like) or the like. The remote vehicle interface generator assembles the initial remote vehicle interface based on the input vehicle characteristics. The initial remote vehicle interface is, in one example, agnostic to electronic devices. In another example, the initial remote vehicle interface is generated based on a specified base electronic device, for instance having extensive input and output capabilities.

In each example, the generated initial remote vehicle interface (accessed, implemented, created, or assembled) includes remote outputs and remote inputs specified for the candidate agricultural vehicle, such as the example agricultural sprayer. For example, the interface includes representative displays and indicators that provide output for the vehicle sensors (e.g., vision sensors; flow meters; pressure transducers; hydraulic pressure; boom height position, articulation; nozzle flow rates; spray patterns; droplet sizes; agricultural product constituents and concentrations; vehicle location, heading; vehicle speed; gear, or the like) as examples of remote outputs. The initial remote vehicle interface further includes remote inputs representative of the controllable features and functions of the agricultural sprayer. The remote inputs include, but are not limited to, remote driving features, such as steering, speed, heading, braking, transmission gear or the like; boom height actuation, articulation; agricultural product flow rate or pressure (valve, orifice or pump control); nozzle flow rate (valve, nozzle or orifice control with one or more of broad or nozzle based control); spray control with modulating nozzles (and optionally flow or pressure control); injection actuation (e.g., control of product constituency and concentrations); or the like.

The remote interface processor of the remote agricultural vehicle interface system includes an interface refinement tool that refines the initial remote vehicle interface based on input characteristics of the remote vehicle control system (e.g., including one or more of the candidate electronic control device, connection, and range). A remote access evaluator includes inputs for one or more of the candidate electronic device characteristics, characteristics of the connection between the vehicle and the device, and the characteristics of the range between the vehicle and the device.

In the present example, input characteristics for the candidate electronic device, such as a personal computer, include, but are not limited to, display size, display resolution, mouse input, keyboard input, or alternate inputs (e.g., pen, stylus, or the like, touch screen capability or the like). For instance, the example personal computer includes a 22-inch monitor, having a 16:9 aspect ratio, a resolution of 2560×1440 pixels, and is touchscreen capable. The keyboard input includes a QWERTY arrangement, function keys and a numeric keypad. Additionally, the personal computer includes a connected mouse and one or more audio outputs (e.g., standalone speakers, a PC speaker, or the like).

The input connection characteristics between the agricultural vehicle and the candidate electronic device include but are not limited to, type of connection, such as radio, cellular, WIFI, satellite, ethernet, broadband, phone, composite connections of wired and wireless connections; connection speed (upload and download speeds), reliability characteristics, or the like. In the present example, the personal computer and agricultural vehicle have a composite connection including ethernet/wired and infield wireless communication. The input characteristics for the present example include, but are not limited to, broadband and ethernet IEEE 802.3 and wireless IEEE 802.11a as connection types, with the associated upload and download speeds for both and reliability ratings for each.

The input range characteristics between the agricultural vehicle and the candidate electronic device include but are not limited to, one or more of physical range, send and receipt lag (e.g., latency of 1 second, 30-40 milliseconds, 2-3 milliseconds or the like), line of sight (or lack thereof) between the device and the agricultural vehicle. In the present example, the input range characteristics include a physical range of 10 miles, a latency of 20 milliseconds, and no line of sight.

The interface refinement tool conducts comparisons of the input characteristics with associated thresholds and, in some instances, comparison of an input with multiple-tiered thresholds. The comparisons, indicating whether thresholds are met or not, guide the conduct of the interface refinement tool to maintain (including modify) or suspend remote inputs and remote outputs of the initial remote vehicle interface. In the present example, the extensive output and input capabilities (e.g., device characteristics) of the personal computer satisfy device output and input thresholds; and connection capabilities (e.g., connection characteristics) of the composite ethernet and wireless connection satisfy one or more connection thresholds. Conversely, the range characteristics of the candidate remote system satisfy some range thresholds. For instance, the physical range of 10 miles satisfies the 25 miles or less threshold and fails to satisfy 10 miles or less, 1 mile or less, and 1000 feet or less thresholds. Further, the relatively remote personal computer also fails to satisfy the line-of-sight threshold.

The interface refinement tool of the remote interface building processor refines (e.g., edits, rebuilds, tunes, modifies, or the like) the initial vehicle remote interface based on the comparisons. For instance, because of the extensive capabilities of the personal computer and the quality of the connection the interface refinement tool maintains many of the remote inputs and remote outputs of the initial remote vehicle interface including status indicators, sensor outputs, automation initiation, and stop functionality, implement control functionality (e.g., flow rate, pressure, coulter depth or the like). The interface refinement tool maintains remote inputs that permit the initiation of autonomous driving and autonomous operation of the agricultural sprayer (e.g., controlled by an onboard vehicle autonomy processor. Conversely, because of the input range characteristics and lack of line of sight and the comparisons conducted on those characteristics, the interface refinement tool suspends the remote inputs for remote driving from the device, including speed, direction, gear, or the like. These features are greyed out or removed from the refined remote vehicle interface.

Maintenance of remote inputs or remote outputs includes modification of the remote inputs or outputs in another example, for instance, to fit within a display, leverage device input features (touchscreen, keyboard, joystick), or the like. Optionally, the modification includes graduation or scaling of remote inputs or remote outputs according to the evaluation of characteristics of the candidate remote system. In one example, a relatively slow connection of 10 Mbps relative to a refinement threshold of 25 Mbps or less, or the like maintains speed control in a refined remote vehicle interface. However, the speed control is graduated in a manner corresponding to the connection between the vehicle and the candidate electronic device. The interface refinement tool correspondingly limits one or more of acceleration or top-end speed based on the relatively slow connection because of the limited responsiveness between events at the vehicle, reporting of the same to the candidate electronic device, as well as delivery of input instructions from the candidate electronic device to the vehicle. Conversely, with connections above one or more refinement thresholds (25 Mbps to 50 Mbps, 50 Mbps to 100 Mbps, or the like), speed control is graduated to permit one or more of a greater acceleration or a greater top-end speed.

In a similar manner, one or more remote inputs or remote outputs for agricultural implement control are modified based on the characteristics of the candidate remote system. For example, a relatively slow connection (e.g., 10 Mbps relative to a refinement threshold of 25 Mbps or less) maintains hydraulic boom height control in a refined remote vehicle interface. However, the boom height control from the candidate electronic device is graduated in a manner corresponding to the connection between the vehicle and the candidate electronic device. The interface refinement tool limits the responsiveness of boom height adjustments (e.g., speed of boom height change) based on a slow connection because of the limited responsiveness between events at the vehicle and the delivery of input instructions from the candidate electronic device to the vehicle. Conversely, with connections above one or more refinement thresholds (25 Mbps to 50 Mbps, 50 Mbps to 100 Mbps, or the like), hydraulic boom height control is graduated to increase the responsiveness of boom height adjustment, including the speed of boom height changes.

After preparation of the refined remote vehicle interface with the interface refinement tool, the remote interface building processor delivers the refined interface through a remote vehicle interface output to the candidate electronic device, the personal computer. The candidate electronic device implements the refined remote vehicle interface, and accordingly, a user having the electronic device may conduct remote control of the agricultural vehicle (a sprayer in this example) with the remote inputs and remote outputs maintained (including modifications thereof) with the refined interface relative to the initial remote vehicle interface.

As a second representative example, a smartphone is located proximate to an agricultural vehicle, such as the previously described sprayer, operating in a field. For example, the smartphone is held by an operator in or near the field, and the agricultural sprayer is within the line of sight of the operator and the electronic device. The smartphone includes a direct wireless connection (e.g., Bluetooth, radio, local WIFI network, or the like) with the agricultural sprayer. The smartphone includes a relatively smaller display in comparison to a personal computer, and the display is touchscreen capable. Optionally, the smartphone includes additional input features, including volume buttons, a home button, or the like.

The remote access evaluator of the remote interface building processor includes inputs for one or more of the candidate electronic device characteristics, characteristics of the connection between the vehicle and the device, and the characteristics of the range between the vehicle and the device. As previously discussed, the remote access evaluator cooperates with the interface refinement tool to maintain or suspend various remote inputs and remote outputs of the initial remote vehicle interface.

In the present example, input characteristics for the candidate electronic device, such as the smartphone, include, but are not limited to, display size, display resolution, touch screen capability, button inputs, or alternate inputs (e.g., pen, stylus, a portable keyboard option or the like). For instance, the example smartphone includes a 6.06-inch touchscreen display, a 19.5:9 aspect ratio, a resolution of 1170×2532 pixels, and includes volume adjustment buttons.

The input connection characteristics between the agricultural vehicle and the candidate smartphone include a local WIFI network having a 25 megabit per second (Mbps) connection speed and reliability characteristics, such as signal strength of −60 decibels per milliwatt (dBm) or the like.

The input range characteristics between the agricultural vehicle and the candidate smartphone include but are not limited to, a physical range of one mile or less, having a line of sight between the smartphone and the vehicle, and a latency of 20-30 milliseconds.

The interface refinement tool conducts comparisons of the input characteristics of the example candidate remote system (e.g., device, connection, range or the like) with specified thresholds. The comparisons guide the conduct of the interface refinement tool to maintain or suspend remote inputs and remote outputs of the initial remote vehicle interface. In the present example, the limited output and input capabilities (e.g., device characteristics) of the smartphone relative to a personal computer satisfy a limited set of device output and input thresholds; and connection capabilities (e.g., connection characteristics) of the WIFI network connection satisfy a variety of connection thresholds (e.g., connection speed, signal strength or the like). Conversely, the range characteristics of the candidate remote system satisfy each of the range thresholds. For instance, the physical range of 1 mile or less satisfies a 1 mile or less threshold. Further, the smartphone in the field or proximate to the field satisfies the line-of-sight threshold.

The interface refinement tool of the remote interface building processor refines (e.g., edits, rebuilds, tunes, modifies, or the like) the initial vehicle remote interface based on the comparisons. For instance, because of the limited capabilities of the smart phone many of the remote inputs and remote outputs of the initial remote vehicle interface are suspended or provided in a condensed form including status indicators, sensor outputs, automation initiation and stop functionality, implement control functionality (e.g., flow rate, pressure, coulter depth or the like). In one example, the smartphone is initially populated with textual status indicators for speed, heading, boom height, agricultural product flow rate, agricultural product pressure, droplet size, and spray pattern. A simplified position indicia for the agricultural sprayer is shown relative to a field map (or portion of the field map). Additionally, an all-stop or emergency-stop touchscreen button is included to permit immediate suspension of all sprayer activity. Optionally, the interface includes tabs, buttons, or the like to permit cycling through various sensor outputs, inputs, or the like. For remote inputs that are maintained, the initial vehicle remote interface is modified in the refined interface to include touchscreen buttons, sliders, or the like are generated to permit control of those vehicle features. In another example, the initial interface is modified in the refined interface to highlight one or more remote inputs as 'active' (presently controlled) vehicle features, and the volume input buttons are associated with the 'active' vehicle feature to permit increasing or decreasing of values for the active vehicle features, such as flow rate, speed, heading, pressure, boom height or the like.

In another example, because of the relatively high-quality connection and range (including line of sight) between the candidate electronic device and the agricultural sprayer the interface refinement tool maintains remote driving capability that permits the user of the smartphone to conduct remote-control steering, throttle control, braking, transmission operation, and operation of the implement (e.g., boom height, product flow rate, droplet size or the like). Further, additional capabilities to initiate autonomous driving and operation of the implement are also maintained. Optionally, more complex features (inputs, outputs, or the like) that are difficult to display on the limited smartphone screen are removed from the refined remote vehicle interface. Complex features include, but are not limited to, schematic boom displays, including multiple flow rate and pressure measurements, nozzle outputs, algorithm or operation editing such as route editing.

In a similar manner to the preparation of the previous refined remote vehicle interface (for the personal computer), the present refined remote vehicle interface for the candidate remote system is output to the candidate electronic device, the smartphone. The candidate electronic device implements the refined remote vehicle interface, and accordingly, a user having the smartphone may conduct remote control of the agricultural vehicle with the remote inputs and remote outputs maintained with the refined interface relative to the initial remote vehicle interface.

The remote agricultural vehicle interface system described herein accordingly permits the generation of refined remote vehicle interfaces for various permutations of agricultural vehicles, electronic control devices, connections, ranges, or the like, herein candidate remote systems. The refined remote vehicle interfaces are configured based on the candidate remote system and provide customized remote outputs and remote inputs that work with a variety of agricultural vehicles, control devices, connections and ranges to facilitate remote control of agricultural vehicles in a manner that utilizes the specific characteristics of the candidate remote system. The refined remote interfaces permit the conduct of remote operation (e.g., monitoring, control, or both) of agricultural vehicles, for instance, to check on agricultural operations and status, navigate obstacles, or address other issues that may arise for a remote agricultural vehicle.

Further, the remote agricultural vehicle interface system permits the toggling of control between different agricultural vehicles with the same or multiple electronic devices. For instance, the remote agricultural vehicle interface system conducts interface building as discussed herein for a plurality of agricultural vehicles, such as agricultural vehicles maintained on a farm, and facilitates toggling (switching) between respective refined remote interfaces for each of the agricultural vehicles with an electronic control device. In one example, an operator in a first agricultural vehicle (e.g., a combine) having a field computer onboard, a tablet computer, or smartphone, may toggle between refined remote vehicle interfaces for each of a plurality of autonomous combines (operating together), an autonomous grain cart or the like and conduct remote operation (monitoring, control or both) of each of the plurality of vehicles. In another example, an operator in a tractor having a tiller may toggle between the refined remote interfaces for an autonomous planter, an autonomous spreader, or the like to conduct remote operation of each of those vehicles.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
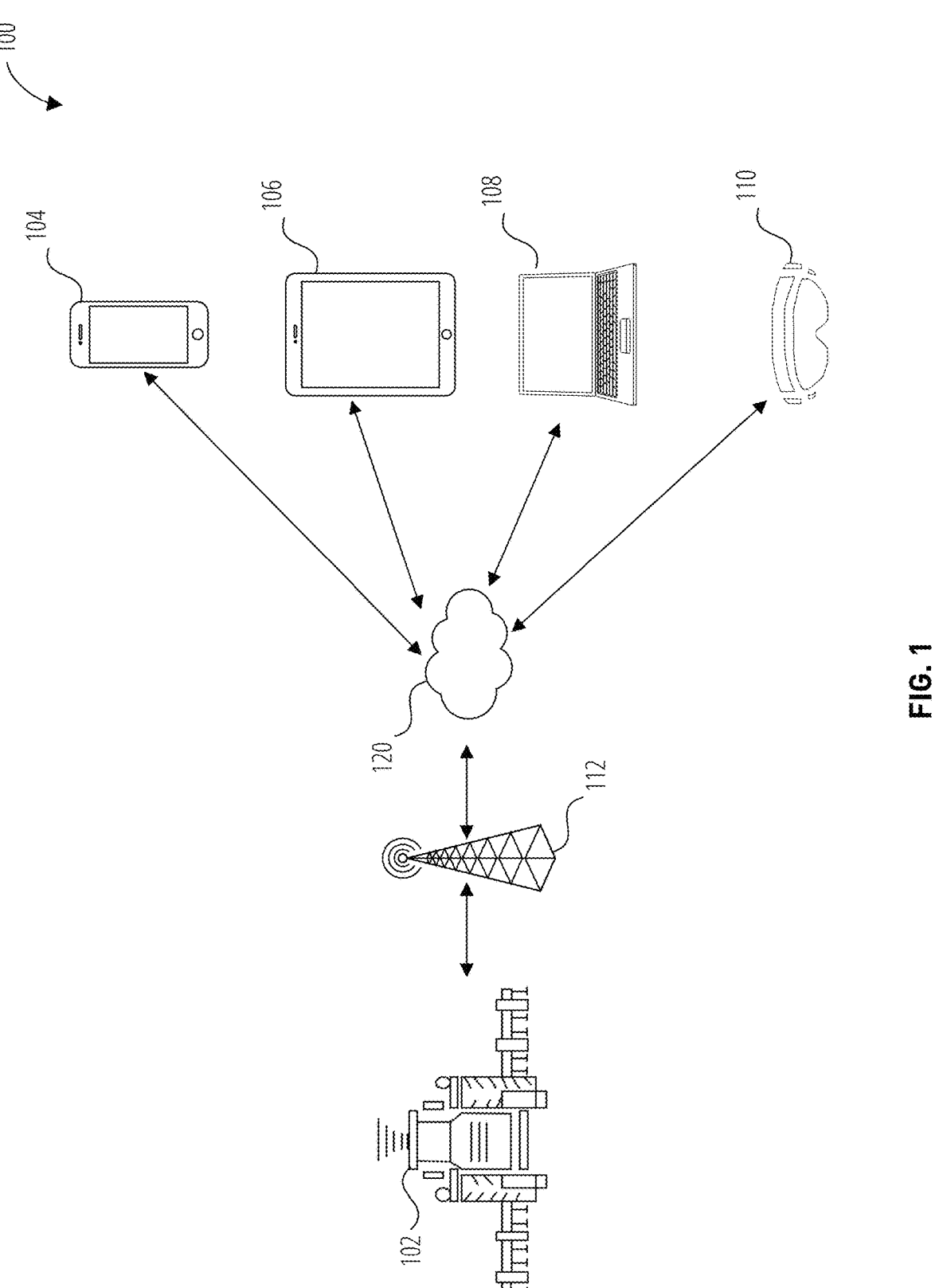
FIG. 1 is a schematic view of one example of a remote agricultural vehicle system.

FIG. 1 is a schematic view of one example of a remote agricultural vehicle system 100. In examples, the remote agricultural vehicle system 100 comprises an agricultural vehicle 102, an electronic device 104, an electronic device 106, an electronic device 108, an electronic device 110, a wireless connection 112, and a remote agricultural vehicle interface system 120.

Examples of the agricultural vehicle 102 includes one or more vehicles, implements, or the like. As provided herein, remote interfaces are generated for each vehicle (including implements, vehicle and implement combinations, or the like).

Examples of the electronic device 104 include a smartphone or similar handheld device that includes a wireless connection capability (e.g., WIFI, cellular, radio or the like). The electronic device 106, in this example, includes a tablet computer or similar handheld device that includes a wireless connection capability (e.g., WIFI, cellular, radio, or the like). In examples, the electronic device 108 includes a personal computer or similar device having extensive input (mouse (or trackpad), keyboard, touchscreen) and output capabilities, and includes one or more of a wired (ethernet) or wireless connection capability (e.g., WIFI, cellular, radio, or the like). According to examples, the electronic device 110 includes a virtual reality (VR) system or augmented reality (AR) system or similar device that includes one or more of a wired (ethernet) or wireless connection capability (e.g., wi-fi, cellular, radio, or the like).

According to examples described herein, the wireless connection 112 provides an information connection between the vehicle and the one or more electronic devices including, but not limited to, direct wireless connection (e.g., WIFI, radio, or the like), indirect wireless connection (e.g., with intervening vehicles, cellular towers, satellites, computers, servers, cloud computers or servers, modems, routers, or the like).

The remote agricultural vehicle interface system 120 is configured to generate and output refined remote vehicle interfaces for use with various vehicles, electronic devices, connection types, connection ranges, or the like, according to examples of the present disclosure. The remote agricultural vehicle interface system 120 is configured to receive vehicle capability characteristics and generate a remote vehicle interface based on the vehicle capabilities. The remote agricultural vehicle interface system 120, according to examples, is also configured to receive one or more of electronic device, vehicle to device connection, vehicle to device range characteristics and refine the remote vehicle interface based on the received characteristics to one or more refined vehicle interfaces. In examples, the remote agricultural vehicle interface system 120 is also configured to output the refined remote vehicle interface to a corresponding candidate electronic device that is refined (e.g., tuned, modified, edited, or the like) for the candidate device and one or more of the connection, range, or the like.

Figure 2:
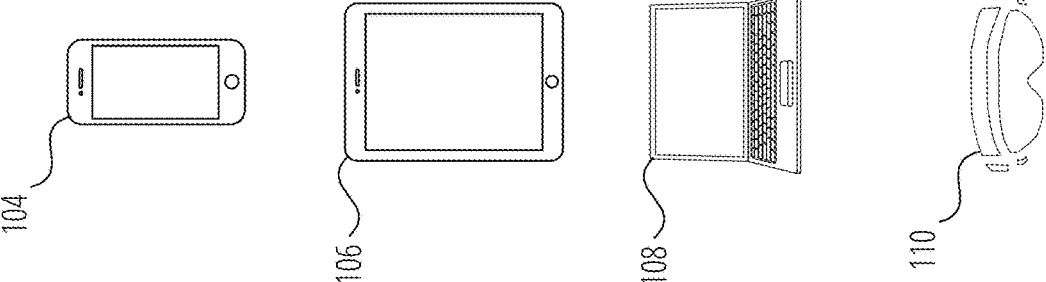
FIG. 2 is a schematic view of one example of a field with agricultural vehicles conducting agricultural operations.
Figure 2:
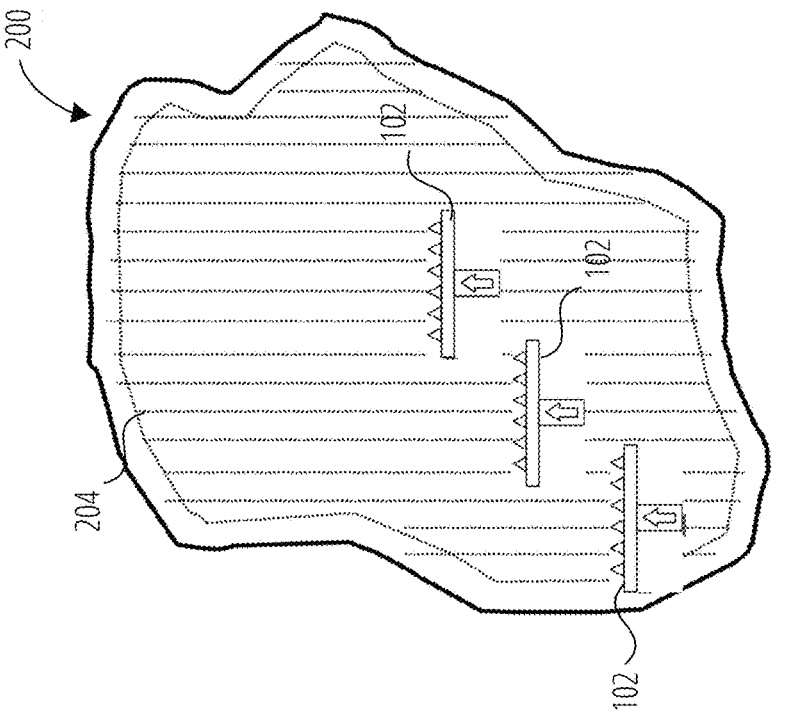

FIG. 2 is a schematic view of one example of a field with agricultural vehicles 102 conducting agricultural operations. The agricultural vehicle 102 includes an operator in one of the vehicles 102 (or remote from each of the vehicles 102) to remotely operate one of the vehicles 102, for instance with an electronic device (e.g., any of the electronic devices 104, 106, 108, or 110) (provided with a vehicle field computer on a first vehicle or separate) when specified. For example, an operator, having an electronic device with the associated refined remote vehicle interface, may interact with and optionally control one or more of the vehicles (e.g., agricultural vehicle 102) if one or more of the vehicles encounters an obstacle (in the field, maintenance, or the like), runs out of a product for application, is full of harvested crops, or the like. Remote operation includes one or more of monitoring, remote control, or the like.

The agricultural vehicle 102 includes one or more vehicles, implements, or the like. As shown in this example, multiple vehicles (e.g., combines) are working in the same field. In another example, the agricultural vehicles are working cooperatively within the field, for instance in a staggered formation to rapidly harvest crops. In examples, the agricultural vehicle 102 optionally includes a display and input device, such as a touchscreen, provided with a field computer on the agricultural vehicle 102. As described herein the display and input device of the vehicle 102 is, in one example, an electronic device that implements the refined remote vehicle interface for another vehicle.

While conducting the agricultural operation one or more of the vehicles are optionally autonomously operated (including semi-autonomously). Each of the vehicles (e.g., agricultural vehicle 102), while conducting similar or different operations, will experience different field conditions, obstacles, conduct various or different operations or the like. Electronic devices (e.g., any one or more of the electronic devices 104, 106, 108, or 110) having the refined remote interfaces described herein permit remote control of those vehicles, for instance to monitor operation, conduct remote control to address one or more situations experienced or the like. Further, because refined remote interfaces are generated for each vehicle (e.g., having varied capabilities, control inputs, status outputs, or the like) an operator may, on a single electronic device, toggle between different vehicles and conduct remote control of each of those vehicles with an interface generated for each respective vehicle.

In this example, the electronic device 104 includes a smartphone or similar handheld device that have different (potentially less) input and output capabilities relative to the devices 106, 108. The refined remote interface for the device 104 includes remote outputs and inputs that, in one example, are more limited and include status information, a location indicator (e.g., GPS, RTK, or the like)), an emergency stop or the like.

In another example, the electronic device 106 includes a tablet computer or similar having different (potentially greater) input and output capabilities relative to the device 104. The refined remote interface for the electronic device 106 in an example includes remote outputs and remote inputs more extensive than with the device 104. For instance, the electronic device 106 includes a larger touch screen that permits the inclusion of additional controls, displays, or the like.

In an additional example, the electronic device 108 includes a personal computer or similar device that has extensive input (mouse, keyboard, touchscreen) and output capabilities. The refined remote interface for the electronic device 108 in an example includes remote outputs and remote inputs more extensive than with the electronic device 104 or the electronic device 106.

In other examples, the electronic device 110 includes a virtual reality (VR) system or augmented reality (AR) system, or similar device. In another example, the electronic device 110 includes the controls of an operator-occupied vehicle that are toggled to instead control an autonomous vehicle (e.g., using a first vehicle cabin in communication with a second vehicle to control the second vehicle). The electronic device 110 permits the use of a simulated vehicle cabin or controls in another vehicle (a sophisticated control environment having extensive remote outputs and remote inputs) to facilitate monitoring and control of a relatively large quantity of features of the remote vehicle. Accordingly, the refined remote interface (having remote outputs and remote inputs) provided to the electronic device 110 is, in one example, similar or the same as the initially generated remote control interface.

As shown in FIG. 2, field 200 in this example includes guidance lines 204, such as guidance lines indexed to a field map. The guidance lines 204 permit automated operation of the vehicles to conduct agricultural operations, in this example, harvesting.

Figure 3:
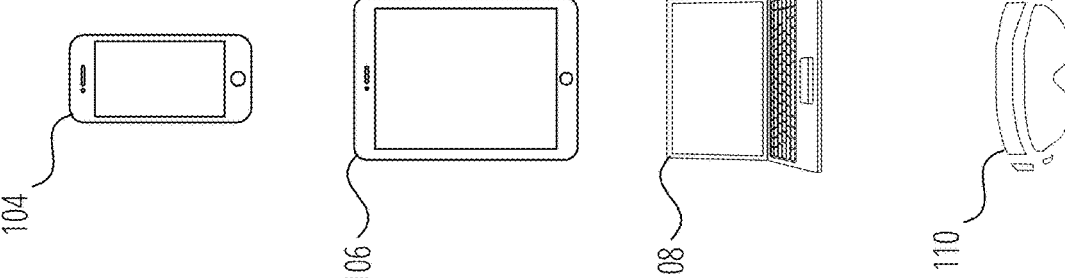
FIG. 3 is a schematic view of the field with other example agricultural vehicles conducting agricultural operations.
Figure 3:
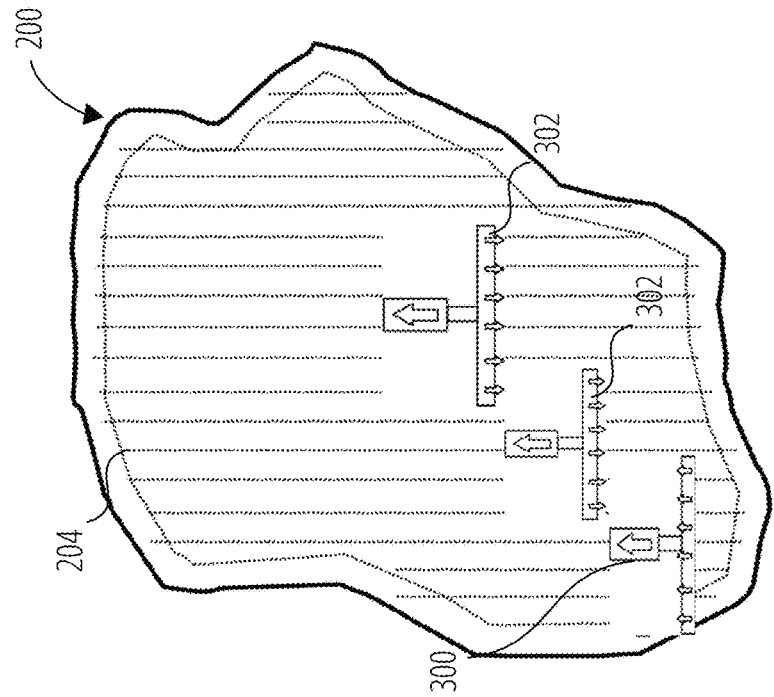

FIG. 3 is a schematic view of the field 200 with other examples of agricultural vehicles (e.g., an agricultural vehicle 300 and an agricultural vehicle 302) conducting agricultural operations. In examples, the agricultural vehicle 300 (e.g., a tiller, cultivator, or similar) includes one or more vehicles, implements, or the like. As shown in the example of FIG. 2, multiple vehicles (e.g., combines) are working in the same field. In another example, the agricultural vehicles are working cooperatively within the field, for instance in a staggered formation to rapidly conduct husbandry for crops (e.g., spraying, cultivating or the like). In examples, the agricultural vehicle 302 (e.g., a planter, sprayer, or the like) includes one or more different vehicles, implements, or the like. For example, the vehicles shown in FIG. 3 conduct different agricultural operations.

In the example shown in FIG. 3, an operator in one of the vehicles 300, 302 (or remote from each of the vehicles) remotely operates one of the vehicles, for instance with an electronic device such as a tablet computer (provided with a vehicle field computer on a first vehicle or separate) when specified. For example, if one of the vehicles encounters an obstacle, runs out of a product for application, is full of harvested crops, or the like the operator remote operates the vehicle by way of an electronic device implementing a refined remote vehicle interface as described herein. Remote operation includes one or more monitoring, remote control, or the like.

While conducting the agricultural operation one or more of the vehicles are optionally autonomously operated (including semi-autonomously). Each of the vehicles, while conducting similar or different operations, will experience different field conditions and obstacles, conduct various or different operations, or the like. Electronic devices having the refined remote interfaces described herein permit remote control of those vehicles, for instance, to monitor operation and conduct remote control to address one or more situations experienced. Further, because refined remote interfaces are generated for each vehicle (e.g., having varied capabilities, control inputs, status outputs, or the like), an operator may, on a single electronic device, toggle between different vehicles and conduct remote control of each of those vehicles.

Figure 4:
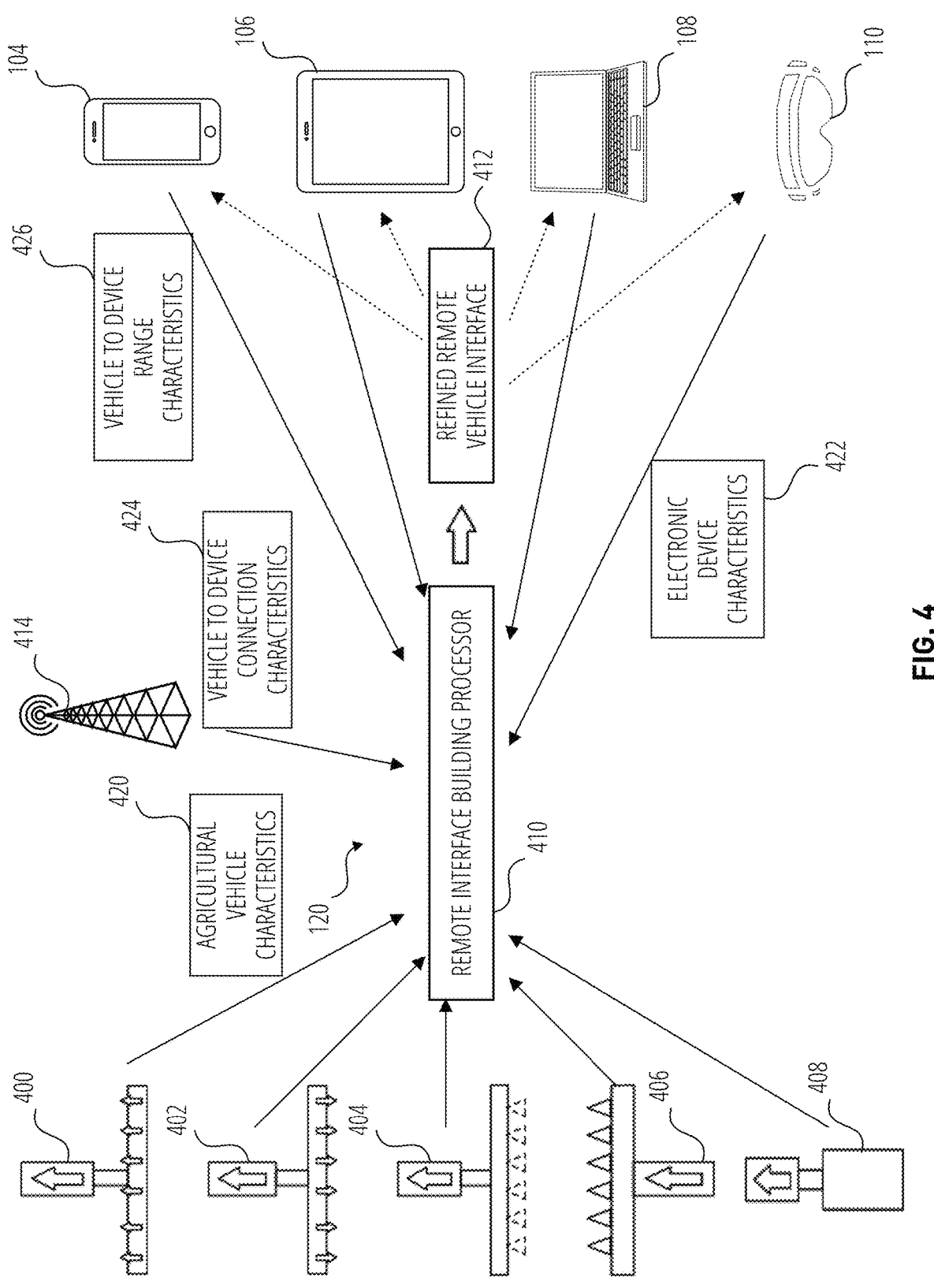
FIG. 4 is a schematic view of one example of a remote agricultural vehicle interface system.

FIG. 4 is a schematic view of one example of a remote agricultural vehicle interface system 120 that generates refined remote vehicle interfaces 412 with one or more remote interface building processors 410. The remote agricultural vehicle interface system 120, according to the example of FIG. 4, includes any of an agricultural vehicle 400 (e.g., a tiller, cultivator, or the like), an agricultural vehicle 402 (e.g., e.g., a planter, seeder, or the like), an agricultural vehicle 404 (e.g., sprayer, spreader, or the like), an agricultural vehicle 406 (e.g., a combine, or the like), and an agricultural vehicle 408 (e.g., grain cart and tractor, or the like). Optionally, associated prime movers, such as a tractor, truck, combine, harvester, or the like, are included with the agricultural vehicles 400-408. In still other examples, the prime movers are distinct agricultural vehicles having associated remote interfaces assembled with the remote interface building processor 410.

The remote interface building processor 410, according to examples, is configured to receive variables such as one or more of agricultural vehicle characteristics 420, electronic device characteristics 422, vehicle to device connection characteristics 424, and vehicle to device range characteristics 426, and output a refined remote vehicle interface 412 to any of the electronic devices (e.g., electronic devices 104-110) or to any of the agricultural vehicles (e.g., agricultural vehicles 400-408) having associated electronic device, such as a field computer.

A connection 414 (including composite connections) permits communication between a candidate electronic device and a vehicle. The connection 414 includes, but is not limited to, radio, cellular, wi-fi, satellite, and in some examples may include other connection formats, such as ethernet or phone, for instance with a composite connection of ethernet at the electronic device 108 and cellular or wi-fi communication in the field.

The agricultural vehicle characteristics 420 are, in one example, transmitted from each of the vehicles 400-408. In other examples, the agricultural vehicle characteristics 420 are available from lookup tables, databases, online catalogs, memory associated with the processor 410 or the like, for instance through model or serial number queries. The agricultural vehicle characteristics 420 include characteristics for each vehicle 400-408 as well as each of variation of the vehicles (e.g., model, OEM, model year, or the like). For instance, one or more sensors, actuators, implement characteristics, control inputs, or the like (collectively, agricultural vehicle characteristics 420) vary between vehicles and between the 'same' vehicles that have different selected options (e.g., at purchase), such as sensor packages, functionality or the like. These agricultural vehicle characteristics 420 are received with an agricultural vehicle capability input (e.g., an agricultural vehicle capability input 506 (FIG. 5)) of the remote ag vehicle interface system 120.

The electronic device characteristics 422, according to one or more examples, includes characteristics associated with each of the candidate electronic devices (e.g., 104-110) that vary as described herein. For instance, a VR setup (e.g., electronic device 110), and personal computer (e.g., electronic device 108), in some examples, provide enhanced output and input capabilities, including expansive displays, keyboards, mice, joysticks, VR goggles or AR glasses, VR hand units, or the like; each of these capabilities is an example of the electronic device characteristics 422. Additionally, the example electronic device (e.g., the electronic device 104, the electronic device 106, the electronic device 108, or the electronic device 110) may have one or more connected input or output devices including, but not limited to, additional displays, joysticks, trackballs, mice, audio devices (speakers), haptic devices (vibrating outputs), physical or simulated control panels (with buttons, controls, indicators and displays imitating vehicle controls), for instance connected by USB cables, wirelessly or the like. Each of these connected devices, their capabilities or the like are an example of electronic device characteristics 422. These electronic device characteristics 422 are received with an electronic device input (e.g., an electronic device input 520 (FIG. 5)) of the remote agricultural vehicle interface systems 120 and in one example are evaluated with a remote access evaluator (e.g., a remote access evaluator 522 (FIG. 5)) to refine a remote vehicle interface.

The vehicle to device connection characteristics 424, for example, are the characteristics for a connection between a candidate electronic device and a vehicle, which varies based on the respective vehicle and device. For instance, a personal computer (e.g., electronic device 108) is, in some examples, connected with a high-speed internet connection to a high bandwidth wireless router that communicates with the vehicle. The characteristics of the connection (e.g., vehicle to device connection characteristics 424), include, but are not limited to, the type of connection (or connections of a composite connection), bandwidth, upload speed, download speed, consistency/reliability of connection, latency (ping rate) or the like. These vehicle to device connection characteristics 424 are received with a vehicle to device connection input (e.g., vehicle-to-device connection input 514 (FIG. 5)) of the remote agricultural vehicle interface system 120 and in one example are evaluated with a remote access evaluator (e.g., the remote access evaluator 522) to refine a remote vehicle interface. For instance, a relatively 'poor' connection that fails to meet connection threshold(s) in one example prompts refinement of the remote vehicle interface to suspend remote outputs or remote inputs that benefit from a 'good' connection that meets the connection thresholds.

The vehicle to device range characteristics 426 include characteristics of range between a candidate electronic device and a vehicle that may vary. For instance, an electronic device in relatively 'close' proximity (a close-range characteristic) to a vehicle includes having a line of sight to another vehicle proximate to a first vehicle, within 0.5 miles or less, 0.25 miles or less, or the like. Conversely, 'remote' proximity (a distant range characteristic) to a vehicle includes absence of line of sight, relaying of inputs and outputs through one or more intermediate vehicles or systems, a distance measurement greater than one or more thresholds (e.g., 1 or more miles, 10 or more miles, or the like). These vehicle to device range characteristics 426 are received with a vehicle to device range input 426 of the remote agricultural vehicle interface system 120 and in one example are evaluated with the remote access evaluator (e.g., the remote access evaluator 522) to refine a remote vehicle interface. For instance, a relative 'remote' connection that fails to satisfy one or more distance threshold(s) in one example refines the remote vehicle interface to suspend remote outputs or remote inputs that benefit from a 'good' connection that meets the connection thresholds.

Figure 5:
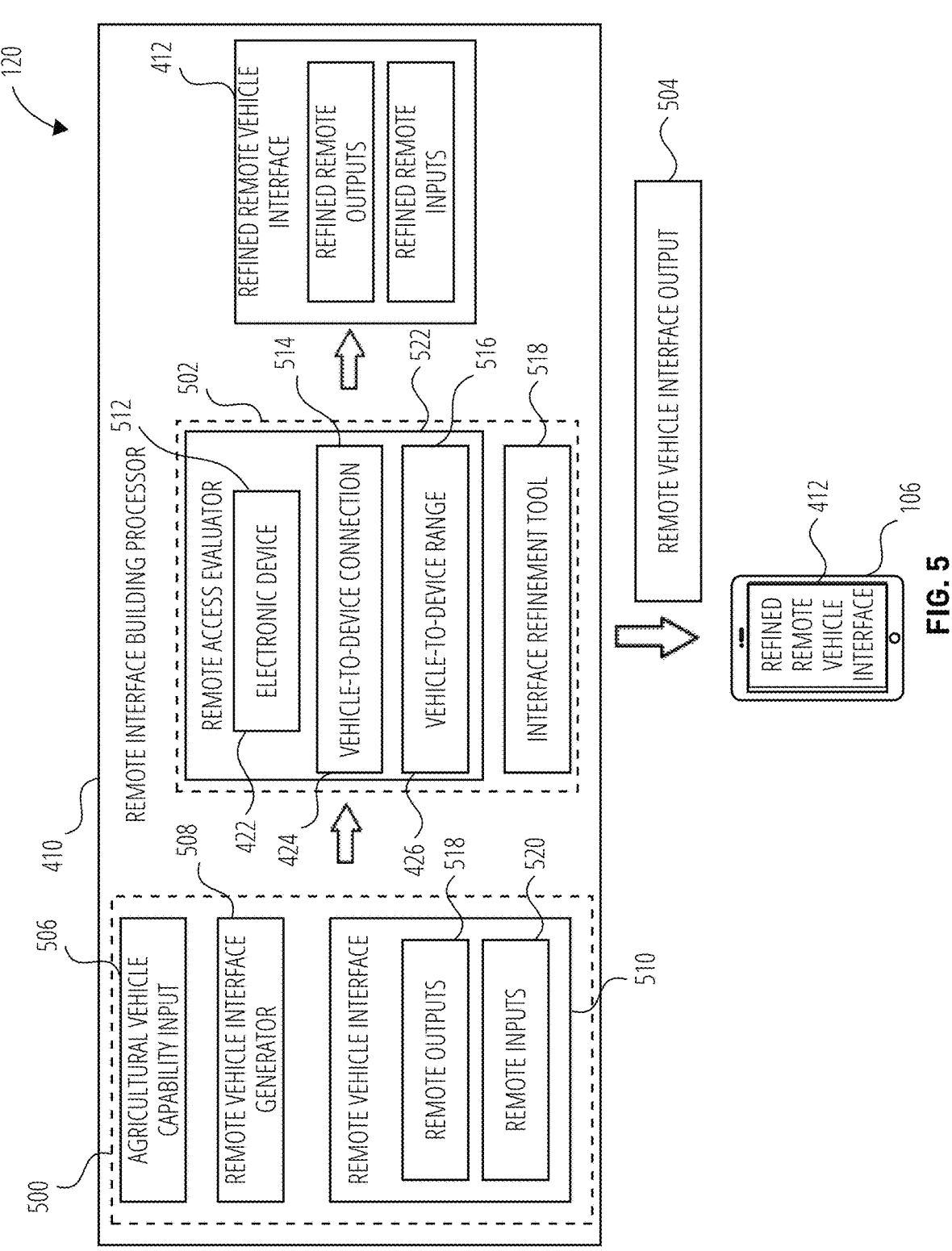
FIG. 5 is another schematic view of the remote agricultural vehicle interface system including a remote interface building processor.

FIG. 5 is another schematic view of the remote agricultural vehicle interface system 120 including a remote interface building processor 410. As shown in the example of FIG. 5, the remote interface building processor 410 includes a vehicle interface generator 500, an interface refinement 502, and the refined remote vehicle interface 412 to remote vehicle interface output 504.

In examples, the remote vehicle interface generator 500 is based on the agricultural vehicle capability input 506, the remote vehicle interface generator 508 and initial remote vehicle interface 510. In examples, the agricultural vehicle capability input 506 includes full, near full, or partial functionality of the agricultural vehicle (e.g., one of 400-408) (e.g., agricultural vehicle characteristics 420). The agricultural vehicle capability input 506, according to examples, receives one or more vehicle characteristics from one or more of the vehicles specified for remote control, a database of vehicles, an online database of vehicles, or the like. The initial interface is refined according to additional characteristics of the candidate remote systems (e.g., one or more of candidate electronic devices, connections, ranges, or the like). The remote vehicle interface generator 508, according to one or more examples, generates an initial or base vehicle interface based on the capabilities of the agricultural vehicle (e.g., the agricultural vehicle characteristics 420). As noted herein, generation includes accessing or implementing initial or base remote vehicle interfaces from a memory, catalog, or database, for instance, with the input of a vehicle serial number, OEM, model and model year, or the like. The initial remote vehicle interface 510, according to examples, includes a remote interface for the agricultural vehicle(s) specified for remote control. The initial remote vehicle interface 510 is based on the received capabilities (characteristics) of the agricultural vehicles. In another example, the agricultural vehicle capability input 506 and the remote vehicle interface generator 508 implement an initial or base remote vehicle interface (from a memory, catalog, or database) for refinement with the initial remote vehicle interface 510. For instance, the input of a vehicle serial number, OEM, model and model year, or the like facilitates access to a corresponding initial or base remote vehicle interface.

The interface refinement 502 receives the initial interface. Based on the received characteristics of one or more of the candidate electronic devices, connection and range the interface is refined (e.g. tuned, modified, updated, or the like) based on the characteristics to provide a refined interface that provides remote control (e.g., one or more of monitoring or control of the agricultural vehicle) commensurate to the circumstances of the candidate remote system (e.g., one or more of electronic device characteristics 422, vehicle to device connection characteristics 424, or the vehicle to device range characteristics 426). In examples, the electronic device input 512 receives the electronic device characteristics 422, the vehicle to device connection input 514 receives the 424, and the vehicle to device range input 516 receives the vehicle to device range characteristics 426. The interface refinement tool 518, in one or more examples, refines the initial or base remote vehicle based on the received characteristics of one or more of the electronic devices, connection, or range. For instance, conducts comparisons of the characteristics with corresponding thresholds. The interface refinement tool 518 then maintains or suspends capabilities (e.g., inputs and outputs) based on the comparisons. For example, characteristics that fail to meet thresholds prompt the tool to suspend capabilities.

As shown in the example of FIG. 5, the remote interface building processor 410 outputs the remote vehicle interface output 504 to the electronic device 106. In examples, the remote vehicle interface output 504 is an output (e.g., data port, transceiver, the wired or wireless interface between the remote interface building processor and the candidate electronic device). The remote vehicle interface output 504 includes the refined remote vehicle interface 412, according to examples. In other examples, a refined remote vehicle interface 412 is generated and delivered to one or more of the devices 104-110 (including the cabin or controls of another vehicle). Each of the refined remote vehicle interfaces is generated based on the characteristics of one or more of the respective electronic devices, connections, or ranges.

Figure 6:
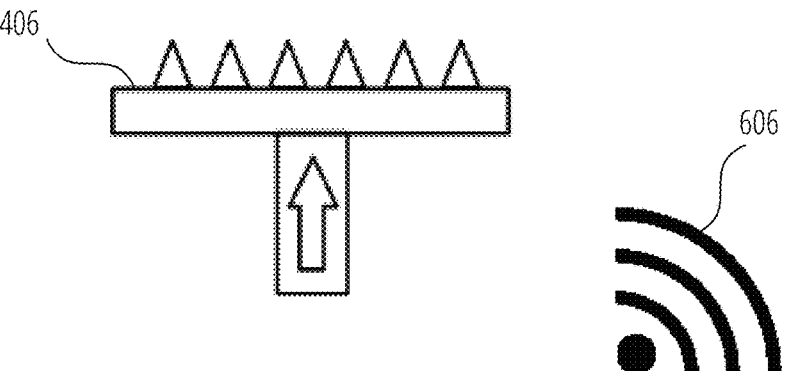
FIG. 6 is an example of a refined remote vehicle interface implemented with a personal computer electronic device.
Figure 6:
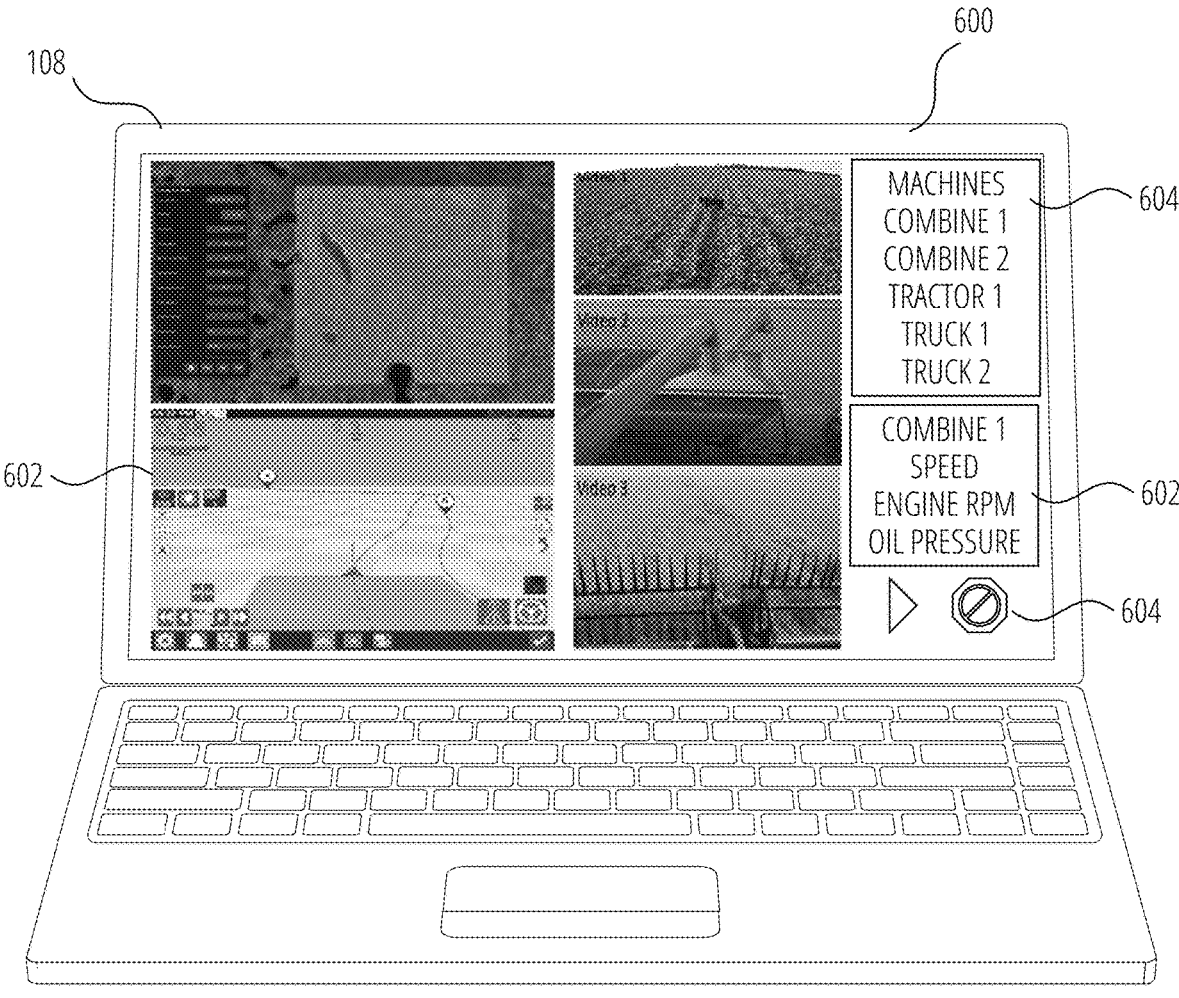

FIG. 6 is a first example of a refined remote vehicle interface 600 implemented with a personal computer electronic device 108. The refined remote vehicle interface 600 includes an example remote interface with remote outputs and remote inputs maintained by way of the interface refinement tool 518 through evaluation conducted with the remote access evaluator (e.g., remote access evaluator 522) having one or more electronic device inputs 512, vehicle to device connection input 514, or vehicle to device range input 516, as examples.

The remote output 602 includes remote outputs of the refined remote vehicle interface 600. In this example, the remote output 602 includes, but is not limited to (in CW order): 1. A rear camera view from the agricultural vehicle; 2. A side camera view directed at a grain spout and grain cart; 3. A front camera view of the ag vehicle; 4. A schematic representation of the vehicle and implement width overlaid on a 3D field representation with a swath edge guidance line and waypoints. Additional status information and virtual remote inputs are also provided, such as a green steering wheel representing a virtual button to initiate remote manual steering; and 5. A GPS-indexed position overlaid on a field map illustrating agricultural process coverage. In one example used with autonomous operation planning of the agricultural vehicle 406 on the electronic device 104. The remote output 602 also includes an example remote output of the refined remote vehicle interface. In this example, the remote output 602 is from a speedometer, tachometer, and oil pressure sensor of the agricultural vehicle.

The remote input 604, in this example, includes the refined remote vehicle interface having a vehicle toggling input configured to permit selective toggling between agricultural vehicles and the associated refined remote vehicle interfaces for those vehicles. Accordingly, the electronic device 108 with the refined remote vehicle interface is configured to control (e.g., monitor, operate, or both) a variety of agricultural vehicles including implements 400-408. The remote input 604 also includes, according to non-limiting examples, remote input of the refined remote vehicle interface. In this example, an all-stop or emergency-stop virtual input is included to permit the rapid halt of the operation of the agricultural vehicle. Additionally, a virtual input (green arrow) is included to permit the initiation of autonomous operation of the ag vehicle (e.g., a combining process, spraying process, tilling process, planting process, or the like). In one example, manual movement control of the agricultural vehicle is suspended, for instance, because of the connection type, range or the like. In another example, manual movement control, including limited manual movement control, is permitted, for instance, by pressing the green steering wheel icon in the remote output.

The vehicle to device connection 606 includes, according to a non-limiting example, one or more of connection type, connection range, or the like. In this example, the connection between the agricultural vehicle 406 and the electronic device 108 is indirect (e.g., with an intervening server, relay vehicle, composite wireless and wired connection, or the like). In another example, the connection type in this example includes a composite connection, such as a wireless network connection, such as a wireless local access network (WLAN) provided through a local wireless router, modem, or the like to the vehicle, and a broadband connection, for instance, provided by an internet service provider (ISP) from the electronic device 108 to the WLAN and to the agricultural vehicle 406.

An example of refinement of the initial remote vehicle interface. In this example: The physical range of the remote device to the vehicle is input to the vehicle-to-device range input 516; the physical range is 8 miles and is "not line of sight". The connection type between a remote device and the vehicle is input to the vehicle-to-device connection input 514; the connection type is "indirect" from the device to the vehicle and includes a composite wireless (WLAN) and broadband connection. The connection quality (an example of connection quality) is input to the vehicle-to-device connection input 514; the connection speed includes two inputs: a wired connection speed of 50 Mbps and a wireless speed of 25 Mbps, having an overall latency of 20-30 milliseconds. In another example, a personal computer as the electronic device 108 having a display resolution of 2560×1440 pixels and an associated keyboard and mouse is input to the electronic device input 512.

The interface refinement tool receives the various inputs and compares the inputs with associated refinement thresholds including bundled refinement thresholds (e.g., related thresholds that, when satisfied, permit the maintenance of interface capabilities between the initial and refined interfaces).

For instance with the characteristics shown in FIG. 6 include: 1. A display threshold of 1920×1080 or greater; the threshold is met with the device 108 resolution of 2560×1440; and 2. A connection threshold of 20 Mbps and latency of 40 milliseconds or less; thresholds are met with the composite connection speed of 50/25 mbps and overall latency of 20-30 ms.

With these thresholds satisfied with the above example characteristics, the interface refinement tool maintains extensive remote outputs, including the various camera views, field, and schematic 3D representations, as well as vehicle status outputs (e.g., speedometer, tachometer, oil pressure, or the like). The relatively expansive resolution (e.g., compared to the display threshold) of the electronic device 108 permits the maintenance of multiple outputs from various sensors of the vehicle. The relatively high-quality connection (e.g., compared to the connection threshold) permits the maintenance of live (including near-to-live) views from the various cameras. Conversely, if one or more thresholds are not met then the associated remote output/input is suspended.

In other examples, refinement thresholds include a series of thresholds including escalating thresholds such as range thresholds of 50 miles or less, 30 miles or less 10 miles or less, 1 mile or less, 1000 feet or less; connection thresholds of 100 Mbps or less, 50 Mbps or less, 25 Mbps or less; or the like.

Figure 7:
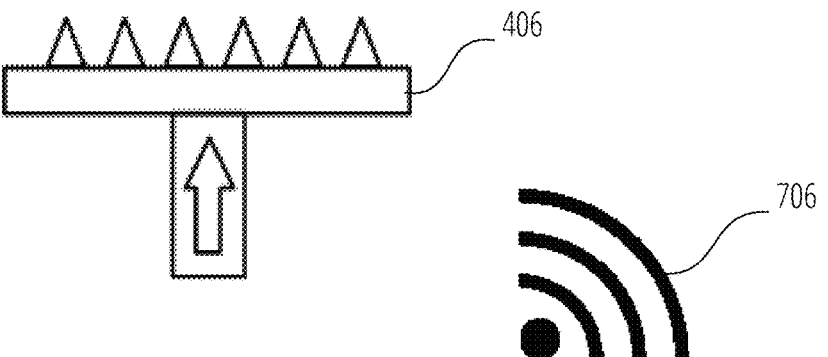
FIG. 7 is an example of a refined remote vehicle interface implemented with a tablet computer electronic device.

FIG. 7 is a second example of a refined remote vehicle interface 700 implemented with an electronic device 106. The refined remote vehicle interface 700 includes, according to examples, a remote output 702, a remote input 704, and a vehicle to device connection 706. As shown in FIG. 7, the refined remote vehicle interface 700 is in communication with the agricultural vehicle 406 via the vehicle to device connection 706.

The remote output 702 includes an example remote output of the refined remote vehicle interface 700. In this example, the output is from a speedometer, tachometer, and oil pressure sensor of the agricultural vehicle. The remote output 702 includes, but are not limited to (in order from top to bottom): 1. A rear camera view from the agricultural vehicle and 2. A schematic representation of the vehicle and implement width overlaid on a 3D field representation with a swath edge guidance line and waypoints. Optionally, the display resolution of the electronic device 106 when compared with higher resolution threshold (e.g., 1920×1200) fails to permit additional remote outputs while comparison with a lower resolution threshold 1024×768 along with touchscreen capability provides a user menu for selecting or toggling between other remote outputs, such as those shown in FIG. 6.

In this example, the remote input 704 of the refined remote vehicle interface 700 includes a vehicle toggling input configured to permit selective toggling between agricultural vehicles and the associated refined remote vehicle interfaces for those vehicles. Accordingly, the electronic device 106 with the refined remote vehicle interface is configured to control (e.g., monitor, operate or both) a variety of agricultural vehicles including agricultural vehicles 400-408. In an example, the remote input 704 includes remote input of the refined remote vehicle interface 700. In this example, an all stop or emergency stop virtual input is included to permit the rapid halt of the operation of the agricultural vehicle. Additionally, a virtual input (green arrow) is included to permit the initiation of autonomous operation of the ag vehicle (e.g., a combining process, spraying process, tilling process, planting process, or the like).

In one example, manual movement control of the agricultural vehicle is suspended, for instance, because of the connection type, range, limited input capabilities of the device 106 or the like. In another example, manual movement control, including limited manual movement control, is permitted, for instance with pressing of the green steering wheel icon in the remote output 902.

The vehicle to device connection 706 (one or more of connection type, connection range, or the like). In this example, the connection between the vehicle 406 and the electronic device 108 is indirect (e.g., with an intervening server, relay vehicle, composite wireless and wired connection, or the like). In another example. The connection type in this example includes a composite connection, such as a wireless network connection, such as a wireless local access network (WLAN) provided through a local wireless router, modem, or the like to the vehicle, and a broadband connection, for instance, provided by an internet service provider (ISP) from the device 108 to the WLAN and to the vehicle 406.

An example of refinement of the initial remote vehicle interface. In this example: The physical range of the remote device to the vehicle is input to the vehicle-to-device range input 516; the physical range is 5 miles and is "not line of sight". The connection type between a remote device and the vehicle is input to the vehicle-to-device connection input 514; the connection type is "indirect" from the device to the vehicle and includes a composite wireless (WLAN) and broadband connection. The connection quality (an example of connection quality) is input to the vehicle-to-device connection input 514; the connection speed includes two inputs: a wired connection speed of 50 Mbps and a wireless speed of 25 Mbps, having an overall latency of 50 milliseconds. In another example, a tablet computer as the electronic device 106 has a display resolution of 1280×800 pixels that is touchscreen capable is input to the electronic device (e.g., the remote input 704).

For example, the interface refinement tool 518 receives the various inputs and compares the inputs with associated refinement thresholds, including bundled refinement thresholds (e.g., related thresholds that, when satisfied, permit the maintenance of interface capabilities between the initial and refined interfaces). For instance, with the characteristics shown in FIG. 7 includes 1. A threshold of 10 miles or less between the remote device and the vehicle; the threshold is met with the 5-mile range; and 2. A display threshold of 1024×768 or greater; the threshold is met with the device 106 resolution of 1280×800. A connection threshold of 20 Mbps and latency of 50 milliseconds or less; thresholds are met with the composite connection speed of 50/25 Mbps and overall latency of 50 ms.

With these refinement thresholds satisfied with the above example characteristics, the interface refinement tool maintains autonomous operation planning capability (e.g., field process planning or pathing, implement settings, or the like), an example of a remote input, with the refined remote vehicle interface. For instance, an operator using the electronic device with the refined interface is permitted to plan the autonomous operation of the agricultural vehicle 406 with the candidate electronic device 106, connection, and connection range provided in the example. Conversely, if one or more refinement thresholds are not met then the associated remote output/input is suspended in the refined remote vehicle interface.

Figure 8:
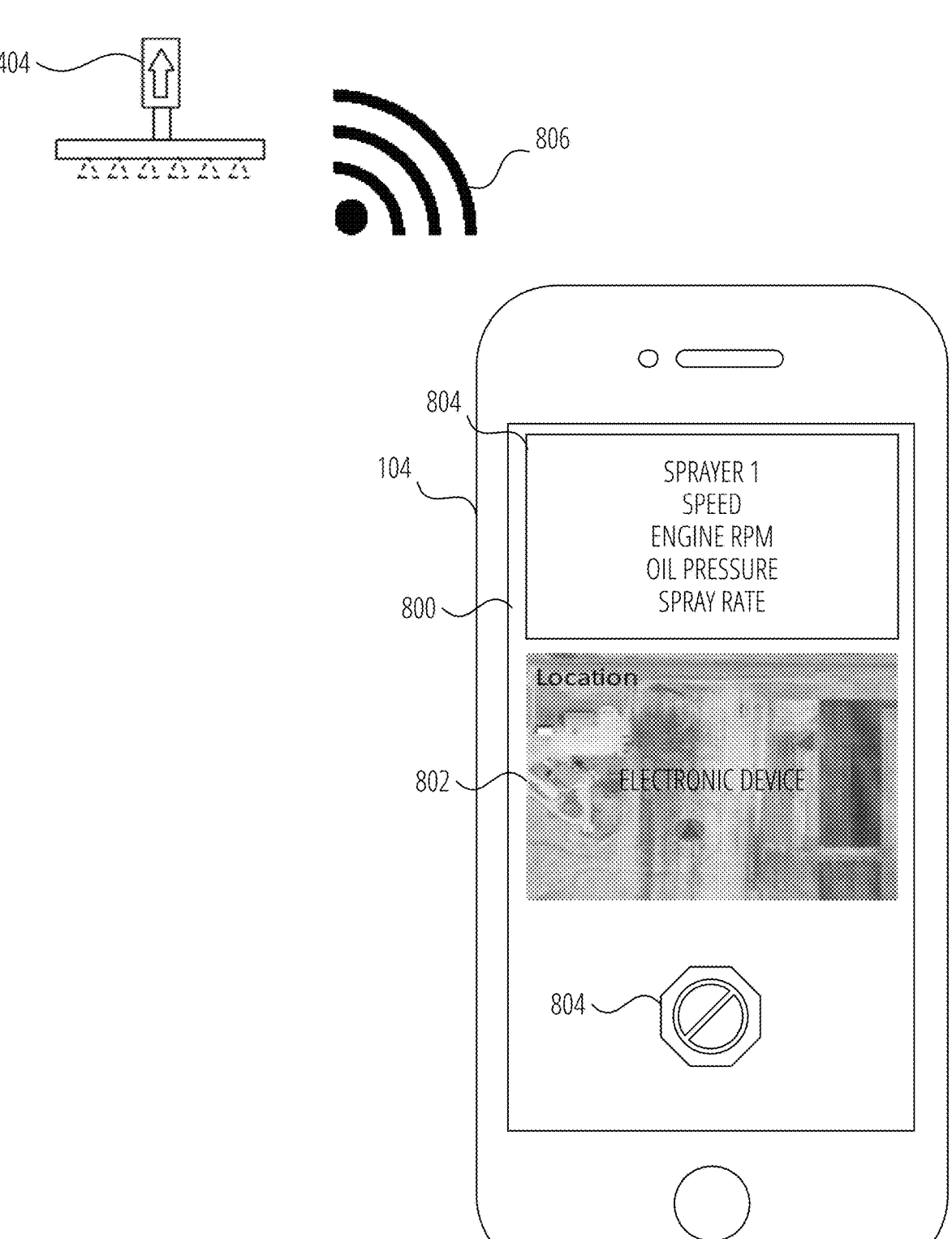
FIG. 8 is an example of a refined remote vehicle interface implemented with a smartphone electronic device.

FIG. 8 is a third example of a refined remote vehicle interface 800 implemented with a smartphone electronic device 104. The refined remote vehicle interface 800, according to one or more examples, includes remote output 802 and remote input 804, maintained by way of the interface refinement tool 518 through evaluation conducted with the remote access evaluator having one or more inputs (e.g., the electronic device input 512, the vehicle to device connection input 514, or vehicle to device range input 516) as examples.

In an example, the remote output 802 of the refined remote vehicle interface 800 includes output from a speedometer, tachometer, oil pressure sensor (e.g., pressure transducer) and agricultural product flow rate (spray rate) are displayed. In an example, the discrete outputs are expandable by touch and are opened, for instance, to illustrate sprayer flow rate, pressure, spray pattern, droplet size or the like through discrete nozzles, nozzle arrays or the like.

In examples, the remote output 802 includes output from a GPS sensor, RTK sensor, or the like illustrating the position of the agricultural vehicle 404 (and in another example other vehicles) overlaid on an image of a field, for instance as provided with a field computer on board the agricultural vehicle 404.

The remote input 804, for example, includes an all-stop or emergency-stop virtual input is included to permit the rapid halt of the operation of the agricultural vehicle. In one example, the all-stop remote input is maintained in all permutations of the remote vehicle interface output (e.g., a threshold is always satisfied with the remote access evaluator or interface refinement tool so the all-stop remote input is maintained irrespective of the remote device; connection type, speed or quality; location of the device relative to the vehicle or the like). In one example, manual movement control of the agricultural vehicle 404 is suspended, for instance, because of the connection type, range, limited input capabilities of the electronic device 106, or the like.

The vehicle to device connection 806 includes one or more of connection type, connection range, or the like. In this example, the connection between the agricultural vehicle 404 and the electronic device 108 is indirect (e.g., with an intervening server, relay vehicle, composite wireless and wired connection, or the like) and there is no line of sight. In another example, the connection type in this example includes a composite connection, such as a wireless network connection, such as a wireless local access network (WLAN) provided through a local wireless router, modem or the like to the vehicle and a cellular connection, for instance provided by an internet service provider cellular provider from the electronic device 108 to the WLAN having the agricultural vehicle 404.

In examples, the remote agricultural vehicle interface system 120 includes a priority designator. In some examples a plurality of electronic devices are available with respective refined remote vehicle interfaces. Optionally, the remote agricultural vehicle interface system 120, the electronic devices themselves or the like are prioritized to ensure the agricultural vehicle is controlled by a single one of the devices; while optionally permitting remote outputs or the like for other candidate electronic devices (for observation) while the priority electronic device maintains remote inputs and outputs.

In one example, one or more input characteristics (e.g., electronic device, connection, connection range, or the like) are prioritized and the candidate remote system having the greatest number of priority characteristics (e.g., closest range, device with the most expansive capabilities, or the like assessed with a comparator) is given priority control of the agricultural vehicle. In another example, an identification input (e.g., employee ID, technician ID, manager ID, or the like) to a candidate electronic device sets that device as having priority control.

An example of refinement of the initial remote interface to generate the refined remote vehicle interface 800. In this example: the physical range of the remote device to the vehicle is input to the vehicle-to-device range input 516; the physical range is 13 miles and is "not line of sight". The connection type between the remote device 104 and the vehicle 404 is input to the vehicle-to-device connection input 514; the connection type is "indirect" from the device to the vehicle and includes a composite wireless (WLAN) and cellular connection. The connection quality (an example of connection quality) is input to the vehicle-to-device connection input 514; the connection speed includes two inputs: a wired connection speed of 50 Mbps and a cellular speed of 70 Mbps, having an overall latency of 60 milliseconds. In another example, a smart phone as the electronic device 104 having a display resolution of 430×932 pixels that is touchscreen capable is input to the electronic device input 512.

The interface refinement tool 518 receives the various inputs and compares the inputs with associated refinement thresholds including bundled refinement thresholds (e.g., related thresholds that, when satisfied, permit the maintenance of interface capabilities between the initial and refined interfaces). For instance with the characteristics shown in FIG. 8: 1. A threshold of 10 miles or less between the electronic device 104 and the agricultural vehicle 404; threshold is not met with the 13 mile range; 2. A display threshold of 414×896 or greater; threshold is met with the device 104 resolution of 430×932; and 3. A connection threshold of 50 mbps or more and latency of 70 milliseconds or less; thresholds are met with the composite connection speed of 50/70 Mbps and overall latency of 60 ms.

With these thresholds satisfied (or conversely not satisfied in some instances) with the above example characteristics, the interface refinement tool maintains remote outputs 802 of the vehicle location relative to a field map and various ag vehicle characteristics (speed, rpm, oil pressure, sprayer characteristics). These outputs are formatted based on the available resolution of the electronic device 104. Additionally, because of the connection range and optionally relatively small display threshold, the remote input 804 includes limited functionality, such as the all-stop or emergency stop icon/button.

Figure 9A:
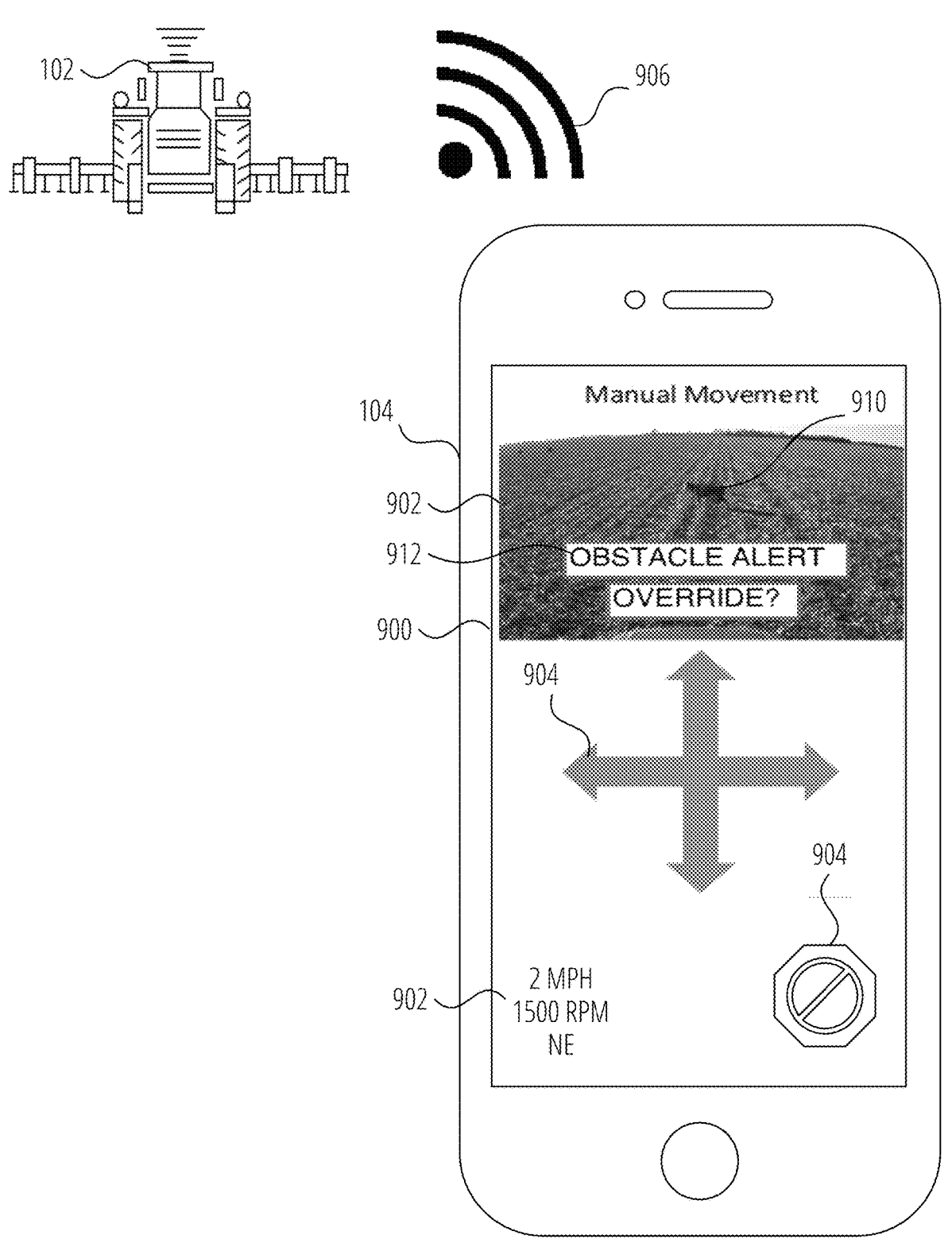
FIG. 9A is an example of a refined remote vehicle interface implemented with the smartphone electronic device and a direct connection with an agricultural vehicle.

FIG. 9A is an example of a refined remote vehicle interface 900 implemented with the smart phone electronic device 104 and a direct connection with an agricultural vehicle 102. The refined remote vehicle interface 900, in an example, includes remote outputs 902 and remote inputs 904 maintained by way of the interface refinement tool 518 through evaluation conducted with the remote access evaluator having one or more inputs electronic device input 512, vehicle to device connection input 514, vehicle to device range input 516, as examples.

In an example, the remote output 902 includes remote output of the refined remote vehicle interface 900. In this example, the output from a camera or video camera onboard the agricultural vehicle including an observed obstacle in front of the vehicle (e.g., livestock). The remote output 902, in one or more examples, includes output from a speedometer, tachometer, and GPS/compass of the agricultural vehicle 102.

In examples, the remote input 904 includes remote input of the refined remote vehicle interface 900. In this example, manual movement control of the agricultural vehicle 102 includes one or more of directional control, throttle, braking, transmission, or the like). The manual movement control is provided in an example with a virtual input (e.g., touchscreen directional arrows, slider for throttle) or a manual input device connected with the electronic device, such as a joystick. The remote input 904 also includes an all-stop or emergency stop virtual input is included to permit the rapid halt of the operation of the agricultural vehicle, according to examples. In one example, the all-stop remote input is maintained in all permutations of the remote vehicle interface output (e.g., a threshold is always satisfied with the remote access evaluator or interface refinement tool so the all stop remote input is maintained irrespective of the remote device; connection type, speed or quality; location of the device relative to the vehicle or the like).

The vehicle-to-device connection 906 includes device connection (one or more connection types, connection range, or the like). In this example, the connection between the vehicle 102 and the electronic device 104 is direct (e.g., without an intervening server, relay vehicle, or the like). In another example, a direct connection includes a line of sight-based connection. The connection type in this example includes a wireless network connection, such as a wireless local access network (WLAN).

The refined remote vehicle interface 900, in some examples, includes obstacle override 912 in response to detecting an obstacle 910. Associated Thresholds for Overriding Permission include permutation 1. Obstacle Stationery AND connection is 20 Mbps or more and 50 ms latency or less; permutation 2. (Obstacle Dynamic (moving) OR Stationary) AND connection is 50 Mbps or more and 25 ms latency or less. If thresholds for permutation 1 are satisfied the refined interface 900 includes a remote input 904 that permits remote overriding of halting of operation and resumption of autonomous operation. If thresholds for permutation 2 are satisfied the remote input permits remote overriding and resumption of autonomous operation for stationary and dynamic obstacles. Manual movement of the machine. An example of refinement of the initial remote vehicle interface. In this example: The physical range of the remote device to the vehicle is input to the vehicle-to-device range input 516; the physical range is 37 meters.

The connection type between the remote device (e.g., the electronic device 104) and the vehicle (e.g., the agricultural vehicle 102) is input to the vehicle-to-device connection input 514; the connection type is "direct" from the device to the vehicle. The connection speed (an example of connection quality) is input to the vehicle-to-device connection input 514; the connection speed is 15 megabits per second. In another example, a joystick connected with the electronic device 104 (a smartphone) is input to the electronic device input 512.

The interface refinement tool receives the various inputs and compares the inputs with associated thresholds, including bundled thresholds (e.g., related thresholds that, when satisfied, in this example, permit device-controlled remote driving). For instance: 1. A threshold of 50 meters or less between the remote device and the vehicle; and one or more of: 2a. A connection type threshold of "direct" between the device and the vehicle OR 2b. A connection quality threshold of 10 MB per second or more. With these thresholds satisfied with the above example characteristics, the interface refinement tool maintains manual movement control capabilities with the refined remote vehicle interface. For instance, an operator using the electronic device with the interface is permitted to conduct remote driving (e.g., forward, backward movement, steering, throttle control, braking, transmission control, or permutations of the same). Conversely, if one or more thresholds are not met then the associated remote output/input is suspended.

In another example, the bundled thresholds to permit device-controlled remote driving further include 3. a physical input device threshold satisfied by the joystick connected with the electronic device. Accordingly, in this example, the previous thresholds and the physical input device threshold are satisfied to permit remote driving with the electronic device having the connection joystick.

Figure 9B:
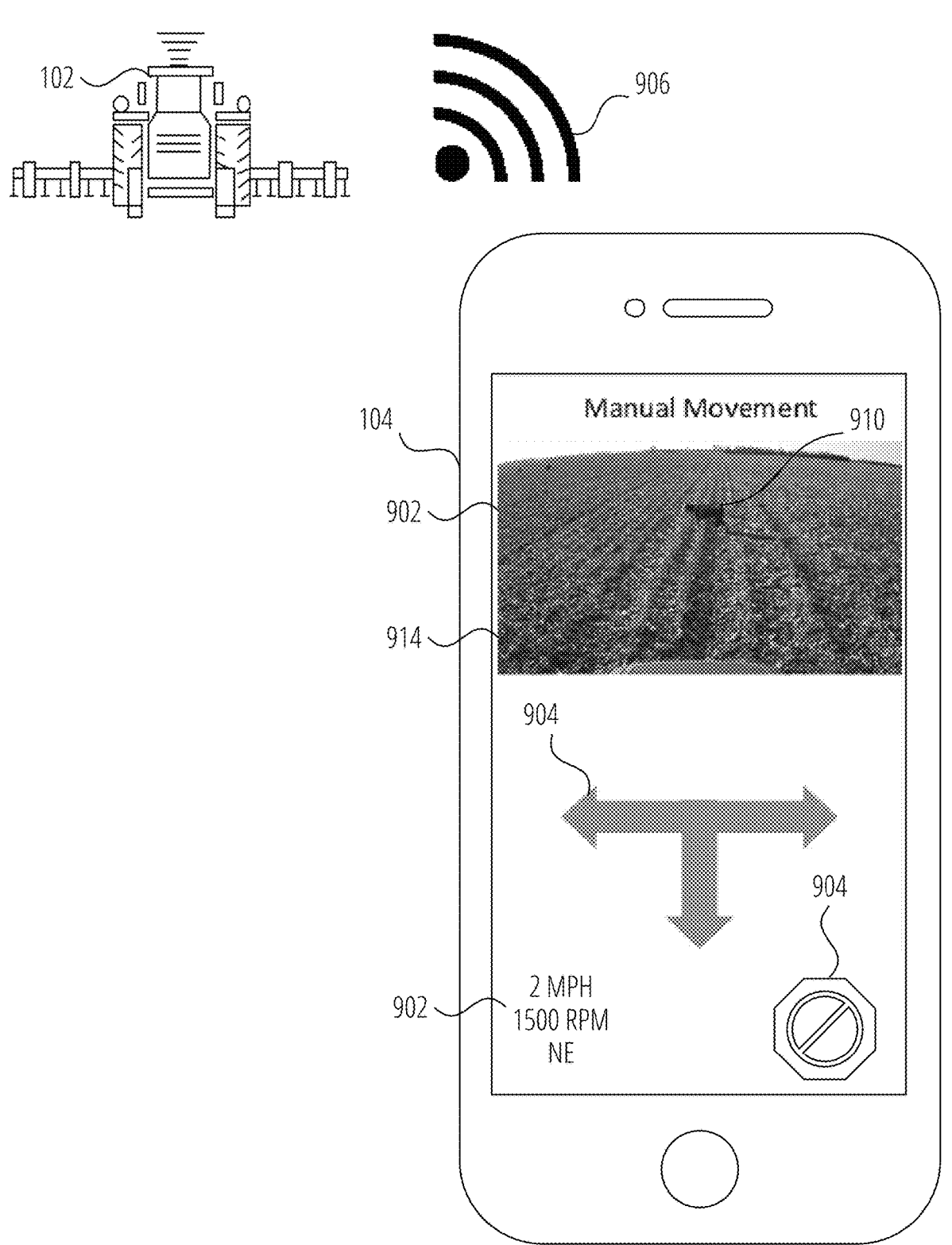
FIG. 9B is an example of a refined remote vehicle interface implemented refined in part based on an example obstacle or example terrain.

FIG. 9B is another example of a refined remote vehicle interface 914 implemented refined in part based on an example obstacle or example terrain (e.g., obstacle 910). The remote output 902, according to examples, include an example remote output of the refined remote vehicle interface. In this example the output from a camera or video camera onboard the agricultural vehicle including an observed obstacle in front of the vehicle (e.g., livestock).

The remote input 904 includes, in one or more examples, an example remote input of the refined remote vehicle interface 914. In this example, manual movement control of the agricultural vehicle includes one or more directional control, throttle, braking, transmission, or the like). The manual movement control is provided in an example with a virtual input (e.g., touchscreen directional arrows, slider for throttle) or a manual input device connected with the electronic device, such as a joystick.

The vehicle to device connection 906 includes one or more of: connection type, connection range, or the like. In this example, the connection between vehicle 102 and electronic device 104 (e.g., the vehicle-to-device connection 906) is direct (e.g., without an intervening server, relay vehicle, or the like). In another example, a direct connection includes a line-of-sight-based connection. The connection type in this example includes a wireless network connection, such as a wireless local access network (WLAN).

The refined remote vehicle interface 914 includes examples of remote interface including remote outputs (e.g., remote output 902) and remote inputs (e.g., remote input 904) maintained by way of the interface refinement tool 518 through evaluation conducted with the remote access evaluator having one or more inputs (e.g., the electronic device input 512, the vehicle to device connection input 514, and the vehicle to device range input 516, as examples.

The obstacle override 912 (e.g., obstacle based refinement), in another example, one or more obstacles (e.g., the obstacle 910) sensed (including sensed and identified) by the agricultural vehicle are another example characteristic received with the remote access evaluator and included in refinement of the remote vehicle interface by the interface refinement tool 518. The interface refinement tool 518 includes one or more refinement thresholds related to obstacles including a crop threshold (planted crops), inanimate threshold (fences, poles, rocks), animate threshold (moving vehicles, animals), livestock threshold (farm animals), and a human threshold. The sensed obstacle as a characteristic received by the remote access evaluator and the interface refinement tool 518 is compared with the various thresholds. In an example, the sensed obstacle is a cow (as shown in FIG. 9). The example obstacle satisfies the livestock threshold; however, it fails to satisfy the human threshold. The interface refinement tool 518 in this example has previously maintained manual movement control with the refined remote vehicle interface used with the electronic device 104 as shown in FIG. 9. The interface refinement tool 518 further modifies the interface based on the satisfaction of the threshold. For instance, manual movement in a purely forward direction is suspended or limited to a halo or radius of 15 feet around the obstacle, while angled, turning, and reverse movement away from the obstacle (the cow) is permitted. Optionally, the suspension or limit of the remote input is further refined based on a connection characteristics (e.g., latency, bandwidth or the like); with a relatively good bandwidth or connection the halo is decreased and/or a speed limit is raised, conversely with a poor connection the halo is increased or the speed limit is further lowered. After successful navigation of the obstacle, its characteristic is removed and the interface refinement tool 518 re-refines the interface to permit manual controlled forward movement with the electronic device and its re-refined interface. In other examples, with lower threshold satisfying obstacles, forward manual movement is maintained as normal, or the halo is lessened based on the type of obstacle (a foot for crops, two feet for inanimate obstacles, three feet for animate obstacles). Conversely, with a higher threshold satisfied (e.g., a human as the obstacle), manual movement is suspended or only permitted in the opposite direction from the human.

The obstacle override 912 also includes terrain based refinement, in another example, local terrain corresponding to the location of the agricultural vehicle is another example characteristic received with the remote access evaluator and included in refinement of the remote vehicle interface by the interface refinement tool 518. The interface refinement tool 518 includes one or more refinement thresholds related to terrain a level threshold, pitched incline/decline threshold, roll incline/decline threshold, trough threshold, ditch/creek threshold, water body threshold or the like. The local terrain is a characteristic received by the remote access evaluator and the interface refinement tool 518 and is compared with the various thresholds. In an example, the local terrain is a trough between hills. The example terrain satisfies the trough threshold, however, fails to satisfy the ditch/creek and water body thresholds. The interface refinement tool 518 in this example has previously maintained manual movement control with the refined remote vehicle interface used with the electronic device 104 as shown in FIG. 9B. The interface refinement tool 518 further modifies the interface based on the satisfaction of the trough threshold. For instance, manual movement in a direction through the trough is suspended or limited to a speed of 3 miles per hour, while movement outside of the terrain (the trough) is permitted at a higher speed of 10 mph. Optionally, the suspension or limit of the remote input is further refined based on connection characteristics (e.g., latency, bandwidth, or the like); with a relatively good bandwidth or connection the speed limit is raised or maintained at a default level and controls for an implement are maintained that may rapidly adjust the implement to adjust its position and avoid terrain collisions and provide rapid visual feedback of the same, conversely with a poor connection the speed limit is further lowered and/or controls for an implement are limited as adjustments may cause collisions that are not observable with slower visual feedback. After successful traversal of the local terrain, its characteristic is removed (including updating with the current local terrain), and the interface refinement tool 518 re-refines the interface to permit full manual controlled forward movement with the electronic device and its re-refined interface. In other examples, with lower thresholds satisfied manual movement in the local terrain is maintained as normal or is limited less (e.g., to 5 miles per hour). Conversely, with a higher threshold satisfied (e.g., ditch/creek) manual movement is suspended or only permitted in an opposite direction out of the terrain.

Various Notes and Aspects

Aspect 1 can include subject matter such as a remote agricultural vehicle interface system comprising: a remote interface building processor including: an agricultural vehicle capability input configured to receive one or more vehicle characteristics of an agricultural vehicle; and a remote vehicle interface generator configured to generate a remote vehicle interface for the agricultural vehicle based on the one or more vehicle characteristics, the remote vehicle interface includes: one or more remote outputs for one or more information or status outputs of the agricultural vehicle; and one or more remote inputs for one or more control inputs of the agricultural vehicle; a remote access evaluator including: an electronic device input configured to receive one or more electronic device characteristics of a candidate electronic device; a vehicle to device connection input configured to receive one or more connection characteristics; and a vehicle to device range input configured to receive one or more range characteristics; and an interface refinement tool configured to refine the remote vehicle interface based on one or more of the electronic device characteristics, connection characteristics, or range characteristics; and a remote vehicle interface output configured to communicate the remote vehicle interface refined with the interface refinement tool to the candidate electronic device.

Aspect 2 can include, or can optionally be combined with the subject matter of Aspect 1, to optionally include wherein the vehicle characteristics include one or more of agricultural implement type, implement actuators, sensors, prime mover type, prime mover actuators, implement actuators, control inputs, informational outputs, status outputs, vehicle cabin layout, or vehicle control layout.

Aspect 3 can include, or can optionally be combined with the subject matter of one or any combination of Aspects 1 or 2 to optionally include wherein the candidate electronic device includes one or more of a smart phone, a tablet computer, a personal computer, a virtual reality system, or an augmented reality system.

Aspect 4 can include, or can optionally be combined with the subject matter of one or any combination of Aspects 1-3 to optionally include wherein the electronic device characteristics include one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

Aspect 5 can include, or can optionally be combined with the subject matter of one or any combination of Aspects 1-4 to optionally include wherein the connection characteristics include one or more of connection type, bandwidth, upload speed, download speed, reliability characteristic or latency.

Aspect 6 can include, or can optionally be combined with the subject matter of Aspects 1-5 to optionally include wherein the range characteristics include one or more of line of sight characteristic, distance between the candidate electronic device and the agricultural vehicle, or intermediate relaying between the candidate electronic device and the agricultural vehicle.

Aspect 7 can include, or can optionally be combined with the subject matter of Aspects 1-6 to optionally include wherein the remote access evaluator includes: a database having a plurality of refinement thresholds; and a refinement comparator configured to compare one or more of the electronic device characteristics, connection characteristics or range characteristics against corresponding refinement thresholds of the plurality of refinement thresholds.

Aspect 8 can include, or can optionally be combined with the subject matter of Aspects 1-7 to optionally include wherein the interface refinement tool is configured to refine the remote vehicle interface by selectively suspending one or more of the remote outputs or remote inputs of the remote vehicle interface according to the comparison of the refinement comparator.

Aspect 9 can include, or can optionally be combined with the subject matter of Aspects 1-8 to optionally include wherein the interface refinement tool is configured to refine the remote vehicle interface by selectively maintaining one or more of the remote outputs or remote inputs of the remote vehicle interface according to the comparison of the refinement comparator.

Aspect 10 can include, or can optionally be combined with the subject matter of Aspects 1-9 to optionally include wherein the remote interface building processor includes a priority designator, and the priority designator is configured to determine a control priority for the candidate electronic device relative to other candidate electronic devices.

Aspect 11 can include, or can optionally be combined with the subject matter of Aspects 1-10 to optionally include wherein the priority designator includes a comparator configured to compare one or more of the electronic device characteristics, connection characteristics or range characteristics to determine the control priority.

Aspect 12 can include, or can optionally be combined with the subject matter of Aspects 1-11 to optionally include wherein the remote vehicle interface generator configured to generate the remote vehicle interface includes the remote vehicle interface generator configured to implement an existing remote vehicle interface as the remote vehicle interface.

Aspect 13 can include, or can optionally be combined with the subject matter of Aspects 1-12 to optionally include the agricultural vehicle.

Aspect 14 can include, or can optionally be combined with the subject matter of Aspects 1-13 to optionally include wherein the agricultural vehicle includes one or more of a prime mover or an implement.

Aspect 15 can include, or can optionally be combined with the subject matter of Aspects 1-14 to optionally include the candidate electronic device.

Aspect 16 can include, or can optionally be combined with the subject matter of Aspects 1-15 to optionally include a remote agricultural vehicle interface system comprising: a remote interface building processor including: an agricultural vehicle capability input configured to receive one or more vehicle characteristics of an agricultural vehicle; and a remote vehicle interface generator configured to access a remote vehicle interface for the agricultural vehicle based on the one or more vehicle characteristics, the remote vehicle interface includes: one or more remote outputs for one or more information or status outputs of the agricultural vehicle; and one or more remote inputs for one or more control inputs of the agricultural vehicle; a remote access evaluator including: an electronic device input configured to receive one or more electronic device characteristics of a candidate electronic device; a vehicle to device connection input configured to receive one or more connection characteristics; and a vehicle to device range input configured to receive one or more range characteristics; an interface refinement tool configured to refine the remote vehicle interface based on one or more of the electronic device characteristics, connection characteristics, or range characteristics; and a remote vehicle interface output configured to communicate the remote vehicle interface refined with the interface refinement tool to the candidate electronic device.

Aspect 17 can include, or can optionally be combined with the subject matter of Aspects 1-16 to optionally include wherein the vehicle characteristics include one or more of agricultural implement type, implement actuators, sensors, prime mover type, prime mover actuators, implement actuators, control inputs, informational outputs, status outputs, vehicle cabin layout, or vehicle control layout.

Aspect 18 can include, or can optionally be combined with the subject matter of Aspects 1-17 to optionally include wherein the candidate electronic device includes one or more of a smart phone, a tablet computer, a personal computer, a virtual reality system, or an augmented reality system.

Aspect 19 can include, or can optionally be combined with the subject matter of Aspects 1-18 to optionally include wherein the electronic device characteristics include one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

Aspect 20 can include, or can optionally be combined with the subject matter of Aspects 1-19 to optionally include wherein the connection characteristics include one or more of connection type, bandwidth, upload speed, download speed, reliability characteristic or latency.

Aspect 21 can include, or can optionally be combined with the subject matter of Aspects 1-20 to optionally include wherein the range characteristics include one or more of line of sight characteristic, distance between the candidate electronic device and the agricultural vehicle, or intermediate relaying between the candidate electronic device and the agricultural vehicle.

Aspect 22 can include, or can optionally be combined with the subject matter of Aspects 1-21 to optionally include wherein the remote access evaluator includes: a database having a plurality of refinement thresholds; and a refinement comparator configured to compare one or more of the electronic device characteristics, connection characteristics or range characteristics against corresponding refinement thresholds of the plurality of evaluation thresholds.

Aspect 23 can include, or can optionally be combined with the subject matter of Aspects 1-22 to optionally include wherein the interface refinement tool is configured to refine the remote vehicle interface by selectively suspending one or more of the remote outputs or remote inputs of the remote vehicle interface according to the comparison of the refinement comparator.

Aspect 24 can include, or can optionally be combined with the subject matter of Aspects 1-23 to optionally include wherein the interface refinement tool is configured to refine the remote vehicle interface by selectively maintaining one or more of the remote outputs or remote inputs of the remote vehicle interface according to the comparison of the refinement comparator.

Aspect 25 can include, or can optionally be combined with the subject matter of Aspects 1-24 to optionally include wherein the remote interface building processor includes a priority designator, and the priority designator is configured to determine a control priority for the candidate electronic device relative to other candidate electronic devices.

Aspect 26 can include, or can optionally be combined with the subject matter of Aspects 1-25 to optionally include wherein the priority designator includes a comparator configured to compare one or more of the electronic device characteristics, connection characteristics or range characteristics to determine the control priority.

Aspect 27 can include, or can optionally be combined with the subject matter of Aspects 1-26 to optionally include wherein the remote vehicle interface generator configured to access the remote vehicle interface includes the remote vehicle interface generator configured to implement an existing remote vehicle interface as the remote vehicle interface.

Aspect 28 can include, or can optionally be combined with the subject matter of Aspects 1-27 to optionally include wherein the remote vehicle interface generator is in communication with a memory having a plurality of existing remote vehicle interfaces including the existing remote vehicle interface.

Aspect 29 can include, or can optionally be combined with the subject matter of Aspects 1-28 to optionally include a method for generating a remote vehicle interface for an agricultural vehicle comprising: generating an initial remote vehicle interface for the agricultural vehicle, generating includes: receiving one or more vehicle characteristics of the agricultural vehicle; and implementing the initial remote vehicle interface according to the received one or more vehicle characteristics, the initial remote vehicle interface having one or more remote outputs or remote inputs; and refining the initial remote vehicle interface based on a candidate remote system, the candidate remote system having one or more of a candidate electronic device, a candidate vehicle to device connection, refining includes: receiving one or more electronic device characteristics of the candidate electronic device; receiving one or more of connection characteristics or range characteristics of the candidate vehicle to device connection; comparing one or more of the electronic device, connection or range characteristics with one or more refinement thresholds; and suspending or maintaining remote outputs or remote inputs of the one or more remote outputs or remote inputs according to the comparing to generate a refined remote vehicle interface.

Aspect 30 can include, or can optionally be combined with the subject matter of Aspects 1-29 to optionally include outputting the refined remote vehicle interface to the candidate electronic device.

Aspect 31 can include, or can optionally be combined with the subject matter of Aspects 1-30 to optionally include wherein implementing the initial remote vehicle interface includes accessing the initial remote vehicle interface from a memory having a plurality of existing remote vehicle interfaces including the initial remote vehicle interface.

Aspect 32 can include, or can optionally be combined with the subject matter of Aspects 1-31 to optionally include wherein implementing the initial remote vehicle interface includes generating the initial remote vehicle interface.

Aspect 33 can include, or can optionally be combined with the subject matter of Aspects 1-32 to optionally include wherein maintaining the remote outputs or remote inputs includes modifying remote outputs or remote inputs.

Aspect 34 can include, or can optionally be combined with the subject matter of Aspects 1-33 to optionally include wherein receiving the one or more vehicle characteristics includes receiving one or more of agricultural implement type, implement actuators, sensors, prime mover type, prime mover actuators, implement actuators, control inputs, informational outputs, status outputs, vehicle cabin layout, or vehicle control layout.

Aspect 35 can include, or can optionally be combined with the subject matter of Aspects 1-34 to optionally include wherein receiving the one or more electronic device characteristics includes receiving one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

Aspect 36 can include, or can optionally be combined with the subject matter of Aspects 1-35 to optionally include wherein receiving the one or more connection characteristics includes receiving one or more of a connection type, bandwidth, upload speed, download speed, reliability characteristic or latency.

Aspect 37 can include, or can optionally be combined with the subject matter of Aspects 1-36 to optionally include wherein receiving the one or more range characteristics includes receiving a line of sight characteristic, distance between the candidate electronic device and the agricultural vehicle, or intermediate relaying between the candidate electronic device and the agricultural vehicle.

Aspect 38 can include, or can optionally be combined with the subject matter of Aspects 1-37 to optionally include wherein comparing the one or more electronic device, connection or range characteristics with one or more refinement thresholds includes: accessing the one or more refinement thresholds from a memory having a plurality of refinement thresholds; and selecting the one or more refinement thresholds from the plurality of refinement thresholds based on correspondence between the electronic device, connection or range characteristics and the one or more refinement thresholds.

Aspect 39 can include, or can optionally be combined with the subject matter of Aspects 1-38 to optionally include wherein comparing the one or more electronic device, connection or range characteristics with one or more refinement thresholds includes comparing the one or more of the electronic device, connection or range characteristics with a series of refinement thresholds.

Aspect 40 can include, or can optionally be combined with the subject matter of Aspects 1-39 to optionally include wherein comparing the one or more electronic device, connection or range characteristics with a series of refinement thresholds includes comparing the one or more of the electronic device, connection or range characteristics with a series of escalating refinement thresholds.

Aspect 41 can include, or can optionally be combined with the subject matter of Aspects 1-40 to optionally include wherein comparing the one or more electronic device, connection or range characteristics with a series of refinement thresholds includes comparing the one or more of the electronic device, connection or range characteristics with a bundle of refinement thresholds.

Aspect 42 can include, or can optionally be combined with the subject matter of Aspects 1-41 to optionally include determining a control priority for the candidate electronic device relative to other candidate electronic devices.

Aspect 43 can include, or can optionally be combined with the subject matter of Aspects 1-42 to optionally include wherein determining the control priority includes comparing one or more of the electronic device characteristics, connection characteristics or range characteristics with characteristics associated with the other candidate electronic devices including respective electronic device characteristics, connection characteristics or range characteristics.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part, for instance with one or more processors, associated memory, input and output devices. Some aspects or examples can include a computer-readable medium or machine-readable medium encoded with instructions operable to configure an electronic device to perform methods as described in the above aspects or examples. An implementation of such methods can include code, circuits, code modules, software modules, hardware modules or the like, such as or having microcode, assembly language code, a higher-level language code, hardwiring or the like. Such code can include computer readable instructions for performing various methods. The code may form portions of computer program products or is included in controllers, programmable logic controllers or the like having modules (e.g., circuits, software, subunits or the like) configured to implement the code and perform the various methods. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), circuits and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A remote agricultural vehicle interface system comprising:
a remote interface building processor including:
an agricultural vehicle capability input configured to receive one or more vehicle characteristics of an agricultural vehicle; and
a remote vehicle interface generator configured to generate a remote vehicle interface for the agricultural vehicle based on the one or more vehicle characteristics, the remote vehicle interface includes:
one or more remote outputs for one or more information or status outputs of the agricultural vehicle; and
one or more remote inputs for one or more control inputs of the agricultural vehicle;
a remote access evaluator including:
an electronic device input configured to receive one or more electronic device characteristics of a candidate electronic device;

a vehicle to device connection input configured to receive one or more connection characteristics; and
a vehicle to device range input configured to receive one or more range characteristics;
an interface refinement tool configured to refine the remote vehicle interface based on one or more of the electronic device characteristics, connection characteristics, or range characteristics; and
a remote vehicle interface output configured to communicate the remote vehicle interface refined with the interface refinement tool to the candidate electronic device, wherein the remote vehicle interface output is configured to:
display the refined remote vehicle interface on the candidate electronic device; and
transmit control signals from the candidate electronic device to the agricultural vehicle to control the operation of the agricultural vehicle based on user interaction with the at least one or more remote inputs, and wherein at least one of the at least one or more remote inputs is configured to permit toggling between multiple agricultural vehicles and multiple refined remote vehicle interfaces associated with the multiple agricultural vehicles.

2. The remote agricultural vehicle interface system of claim 1, wherein the vehicle characteristics include one or more of agricultural implement type, implement actuators, sensors, prime mover type, prime mover actuators, implement actuators, control inputs, informational outputs, status outputs, vehicle cabin layout, or vehicle control layout.

3. The remote agricultural vehicle interface system of claim 1, wherein the candidate electronic device includes one or more of a smart phone, a tablet computer, a personal computer, a virtual reality system, or an augmented reality system.

4. The remote agricultural vehicle interface system of claim 1, wherein the electronic device characteristics include one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

5. The remote agricultural vehicle interface system of claim 1, wherein the connection characteristics include one or more of connection type, bandwidth, upload speed, download speed, reliability characteristic or latency.

6. The remote agricultural vehicle interface system of claim 1, wherein the range characteristics include one or more of line of sight characteristic, distance between the candidate electronic device and the agricultural vehicle, or intermediate relaying between the candidate electronic device and the agricultural vehicle.

7. The remote agricultural vehicle interface system of claim 1, wherein the remote access evaluator includes:
a database having a plurality of refinement thresholds; and
a refinement comparator configured to compare one or more of the electronic device characteristics, connection characteristics or range characteristics against corresponding refinement thresholds of the plurality of refinement thresholds.

8. The remote agricultural vehicle interface system of claim 7, wherein the interface refinement tool is configured to refine the remote vehicle interface by selectively suspending one or more of the remote outputs or remote inputs of the remote vehicle interface according to the comparison of the refinement comparator.

9. The remote agricultural vehicle interface system of claim 7, wherein the interface refinement tool is configured to refine the remote vehicle interface by selectively maintaining one or more of the remote outputs or remote inputs of the remote vehicle interface according to the comparison of the refinement comparator.

10. The remote agricultural vehicle interface system of claim 1, wherein the remote interface building processor includes a priority designator, and the priority designator is configured to determine a control priority for the candidate electronic device relative to other candidate electronic devices.

11. The remote agricultural vehicle interface system of claim 10, wherein the priority designator includes a comparator configured to compare one or more of the electronic device characteristics, connection characteristics or range characteristics to determine the control priority.

12. The remote agricultural vehicle interface system of claim 1, wherein the remote vehicle interface generator configured to generate the remote vehicle interface includes the remote vehicle interface generator configured to implement an existing remote vehicle interface as the remote vehicle interface.

13. The remote agricultural vehicle interface system of claim 1 comprising the agricultural vehicle.

14. The remote agricultural vehicle interface system of claim 1, wherein the agricultural vehicle includes one or more of a prime mover or an implement.

15. The remote agricultural vehicle interface system of claim 1 comprising the candidate electronic device.

16. A remote agricultural vehicle interface system comprising:
  a remote interface building processor including:
    an agricultural vehicle capability input configured to receive one or more vehicle characteristics of an agricultural vehicle; and
    a remote vehicle interface generator configured to access a remote vehicle interface for the agricultural vehicle based on the one or more vehicle characteristics, the remote vehicle interface includes:
      one or more remote outputs for one or more information or status outputs of the agricultural vehicle; and
      one or more remote inputs for one or more control inputs of the agricultural vehicle;
  a remote access evaluator including:
    an electronic device input configured to receive one or more electronic device characteristics of a candidate electronic device;
    a vehicle to device connection input configured to receive one or more connection characteristics; and
    a vehicle to device range input configured to receive one or more range characteristics;
  an interface refinement tool configured to refine the remote vehicle interface based on one or more of the electronic device characteristics, connection characteristics, or range characteristics; and
  a remote vehicle interface output configured to communicate the remote vehicle interface refined with the interface refinement tool to the candidate electronic device, wherein the remote vehicle interface output is configured to:
    display the refined remote vehicle interface on the candidate electronic device; and transmit control signals from the candidate electronic device to the agricultural vehicle to control the operation of the agricultural vehicle based on user interaction with the at least one or more remote inputs, and wherein at least one of the at least one or more remote inputs is configured to permit toggling between multiple agricultural vehicles and multiple refined remote vehicle interfaces associated with the multiple agricultural vehicles.

17. The remote agricultural vehicle interface system of claim 16, wherein the vehicle characteristics include one or more of agricultural implement type, implement actuators, sensors, prime mover type, prime mover actuators, implement actuators, control inputs, informational outputs, status outputs, vehicle cabin layout, or vehicle control layout.

18. The remote agricultural vehicle interface system of claim 16, wherein the candidate electronic device includes one or more of a smart phone, a tablet computer, a personal computer, a virtual reality system, or an augmented reality system.

19. The remote agricultural vehicle interface system of claim 16, wherein the electronic device characteristics include one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

20. The remote agricultural vehicle interface system of claim 16, wherein the connection characteristics include one or more of connection type, bandwidth, upload speed, download speed, reliability characteristic or latency.

21. The remote agricultural vehicle interface system of claim 16, wherein the range characteristics include one or more of line of sight characteristic, distance between the candidate electronic device and the agricultural vehicle, or intermediate relaying between the candidate electronic device and the agricultural vehicle.

22. The remote agricultural vehicle interface system of claim 16, wherein the remote access evaluator includes:
  a database having a plurality of refinement thresholds; and
  a refinement comparator configured to compare one or more of the electronic device characteristics, connection characteristics or range characteristics against corresponding refinement thresholds of the plurality of evaluation thresholds.

23. The remote agricultural vehicle interface system of claim 22, wherein the interface refinement tool is configured to refine the remote vehicle interface by selectively suspending one or more of the remote outputs or remote inputs of the remote vehicle interface according to the comparison of the refinement comparator.

24. The remote agricultural vehicle interface system of claim 22, wherein the interface refinement tool is configured to refine the remote vehicle interface by selectively maintaining one or more of the remote outputs or remote inputs of the remote vehicle interface according to the comparison of the refinement comparator.

25. The remote agricultural vehicle interface system of claim 16, wherein the remote interface building processor includes a priority designator, and the priority designator is configured to determine a control priority for the candidate electronic device relative to other candidate electronic devices.

26. The remote agricultural vehicle interface system of claim 25, wherein the priority designator includes a comparator configured to compare one or more of the electronic device characteristics, connection characteristics or range characteristics to determine the control priority.

27. The remote agricultural vehicle interface system of claim 16, wherein the remote vehicle interface generator configured to access the remote vehicle interface includes the remote vehicle interface generator configured to implement an existing remote vehicle interface as the remote vehicle interface.

28. The remote agricultural vehicle interface system of claim 27, wherein the remote vehicle interface generator is in communication with a memory having a plurality of existing remote vehicle interfaces including the existing remote vehicle interface.

29. A method for generating a remote vehicle interface for an agricultural vehicle comprising:

generating an initial remote vehicle interface for the agricultural vehicle, generating includes:

receiving one or more vehicle characteristics of the agricultural vehicle; and implementing the initial remote vehicle interface according to the received one or more vehicle characteristics, the initial remote vehicle interface having one or more remote outputs or remote inputs; and refining the initial remote vehicle interface based on a candidate remote system, the candidate remote system having one or more of a candidate electronic device, a candidate vehicle to device connection, refining includes:

receiving one or more electronic device characteristics of the candidate electronic device;

receiving one or more of connection characteristics or range characteristics of the candidate vehicle to device connection;

comparing one or more of the electronic device, connection or range characteristics with one or more refinement thresholds; and suspending or maintaining remote outputs or remote inputs of the one or more remote outputs or remote inputs according to the comparing to generate a refined remote vehicle interface;

displaying the refined remote vehicle interface on the candidate electronic device;

receiving, via the refined remote vehicle interface, user control inputs directed to the one or more remote inputs;

transmitting control signals corresponding to the user control inputs from the candidate electronic device to the agricultural vehicle; and controlling operation of the agricultural vehicle based on the transmitted control signals;

wherein at least one of the one or more remote inputs permits toggling between multiple agricultural vehicles and multiple refined remote vehicle interfaces associated with the multiple agricultural vehicles.

30. The method of claim 29 comprising outputting the refined remote vehicle interface to the candidate electronic device.

31. The method of claim 29, wherein implementing the initial remote vehicle interface includes accessing the initial remote vehicle interface from a memory having a plurality of existing remote vehicle interfaces including the initial remote vehicle interface.

32. The method of claim 29, wherein implementing the initial remote vehicle interface includes generating the initial remote vehicle interface.

33. The method of claim 29, wherein maintaining the remote outputs or remote inputs includes modifying remote outputs or remote inputs.

34. The method of claim 29, wherein receiving the one or more vehicle characteristics includes receiving one or more of agricultural implement type, implement actuators, sensors, prime mover type, prime mover actuators, implement actuators, control inputs, informational outputs, status outputs, vehicle cabin layout, or vehicle control layout.

35. The method of claim 29, wherein receiving the one or more electronic device characteristics includes receiving one or more of device type, display size, display resolution, buttons, touch screen capability, touch screen resolution, haptic feedback capability, audio capability, keyboard presence, manual input device presence, connected input devices, connected output devices, device processor characteristics, virtual or augmented reality display capability, or virtual or augmented reality manual input capability.

36. The method of claim 29, wherein receiving the one or more connection characteristics includes receiving one or more of a connection type, bandwidth, upload speed, download speed, reliability characteristic or latency.

37. The method of claim 29, wherein receiving the one or more range characteristics includes receiving a line of sight characteristic, distance between the candidate electronic device and the agricultural vehicle, or intermediate relaying between the candidate electronic device and the agricultural vehicle.

38. The method of claim 29, wherein comparing the one or more electronic device, connection or range characteristics with one or more refinement thresholds includes:

accessing the one or more refinement thresholds from a memory having a plurality of refinement thresholds; and selecting the one or more refinement thresholds from the plurality of refinement thresholds based on correspondence between the electronic device, connection or range characteristics and the one or more refinement thresholds.

39. The method of claim 29, wherein comparing the one or more electronic device, connection or range characteristics with one or more refinement thresholds includes comparing the one or more of the electronic device, connection or range characteristics with a series of refinement thresholds.

40. The method of claim 39, wherein comparing the one or more electronic device, connection or range characteristics with a series of refinement thresholds includes comparing the one or more of the electronic device, connection or range characteristics with a series of escalating refinement thresholds.

41. The method of claim 39, wherein comparing the one or more electronic device, connection or range characteristics with a series of refinement thresholds includes comparing the one or more of the electronic device, connection or range characteristics with a bundle of refinement thresholds.

42. The method of claim 29 comprising determining a control priority for the candidate electronic device relative to other candidate electronic devices.

43. The method of claim 42, wherein determining the control priority includes comparing one or more of the electronic device characteristics, connection characteristics or range characteristics with characteristics associated with the other candidate electronic devices including respective electronic device characteristics, connection characteristics or range characteristics.

* * * * *